US012734690B2

(12) United States Patent
Watanabe et al.

(10) Patent No.: US 12,734,690 B2
(45) Date of Patent: Sep. 15, 2026

(54) CONTROL DEVICE, ROBOT SYSTEM, ROBOT CONTROL METHOD, AND ROBOT CONTROL PROGRAM

(71) Applicant: KAWASAKI JUKOGYO KABUSHIKI KAISHA, Kobe (JP)

(72) Inventors: Masayuki Watanabe, Kobe (JP); Tomoki Sakuma, Kobe (JP); Hiroki Kinoshita, Kobe (JP); Hiroki Takahashi, Kobe (JP); Kai Shimizu, Kobe (JP); Hiroki Tanaka, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 33 days.

(21) Appl. No.: 18/698,028

(22) PCT Filed: Oct. 4, 2022

(86) PCT No.: PCT/JP2022/037135
§ 371 (c)(1),
(2) Date: Apr. 3, 2024

(87) PCT Pub. No.: WO2023/058653
PCT Pub. Date: Apr. 13, 2023

(65) Prior Publication Data

US 2024/0399571 A1 Dec. 5, 2024

(30) Foreign Application Priority Data

Oct. 5, 2021 (JP) ................................ 2021-164313

(51) Int. Cl.
*B25J 9/16* (2006.01)

(52) U.S. Cl.
CPC ............ *B25J 9/1653* (2013.01); *B25J 9/161* (2013.01); *B25J 9/1633* (2013.01); *B25J 9/1689* (2013.01)

(58) Field of Classification Search
CPC .... B25J 11/0065; B25J 13/025; B25J 13/085; B25J 9/161; B25J 9/1653; B25J 9/1689;
(Continued)

(56) References Cited

U.S. PATENT DOCUMENTS

2011/0093120 A1* 4/2011 Ando .................... B25J 9/1638 700/260
2016/0229050 A1* 8/2016 Wang .................... B25J 13/025
2023/0010302 A1* 1/2023 Shimamoto ............ B25J 9/1697

FOREIGN PATENT DOCUMENTS

DE 102017100101 A1 * 7/2018 ......... G05B 19/0426
JP H3-162289 A 7/1991
JP 2001277162 A * 10/2001

OTHER PUBLICATIONS

Translation of DE102017100101A1 (Year: 2017).*
(Continued)

*Primary Examiner* — Adam R Mott
*Assistant Examiner* — James Miller Watts, III
(74) *Attorney, Agent, or Firm* — METROLEX IP LAW GROUP, PLLC; Robert L. Scott, Esq.

(57) ABSTRACT

A controller 3 includes: a force controller 36 that performs force control of moving a robot 1 in accordance with an operation force exerted on an operator 2 from a user U to apply a treatment to an object W and of moving the operator 2 in accordance with a reaction force exerted on the robot 1 from the object W; an estimator 37 that estimates a dynamic characteristic of the user U; and an adjuster 310 that adjusts a control parameter of the force control in accordance with the estimated dynamic characteristic of the user such that a frequency characteristic of the force control approaches a target frequency characteristic.

8 Claims, 9 Drawing Sheets

(58) Field of Classification Search
CPC ......... B25J 9/1633; G05B 2219/40132; G05B 2219/40184
See application file for complete search history.

(56) References Cited

OTHER PUBLICATIONS

Translation of JP2001277162A (Year: 2001).*
Sukhan Lee et al: "Modeling, Design and Evaluation for Advanced Teleoperator Control Systems", Proceedings of the 1992 IEEE/RSJ International Conference on Intelligent Robots and Systems, Jul. 7, 1992, vol. 2, 7, pp. 881-888, Raleigh, NC; Cited in EESR issued on Jan. 3, 2025 in a counterpart European patent application No. 22878521.

* cited by examiner

100
U
2
21
22
23
20
24
3
1
12
12a
12b
R1
Zr
Or
Xr
10
14
11
11a
13
W
Zt
Xt
Ot
Zn
Xn
On
Zm
Xm
Om 62
63
61
36
CONTACT FORCE ACQUIRER
fs
+
+
fm
OPERATION FORCE ACQUIRER
1
13
41
64
51
2
23
CONTACT FORCE SENSOR
INPUT PROCESSOR
FORCE-SPEED CONVERTER
INPUT PROCESSOR
OPERATION FORCE SENSOR
15
SERVO MOTOR
ACTION CONTROLLER
xd'
ACTION CONTROLLER
SERVO MOTOR
GRINDING DEVICE
42
16
26
52
25
11a
65
66
xds
xdm
SLAVE OUTPUTTER
MASTER OUTPUTTER

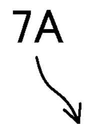
FIG. 10
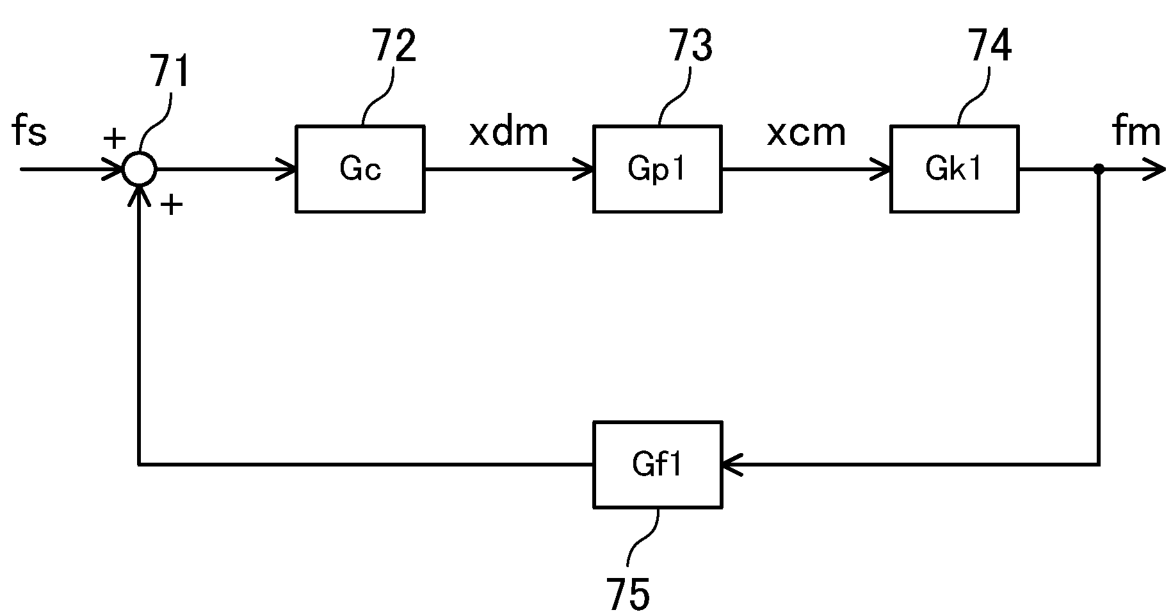
FIG. 11
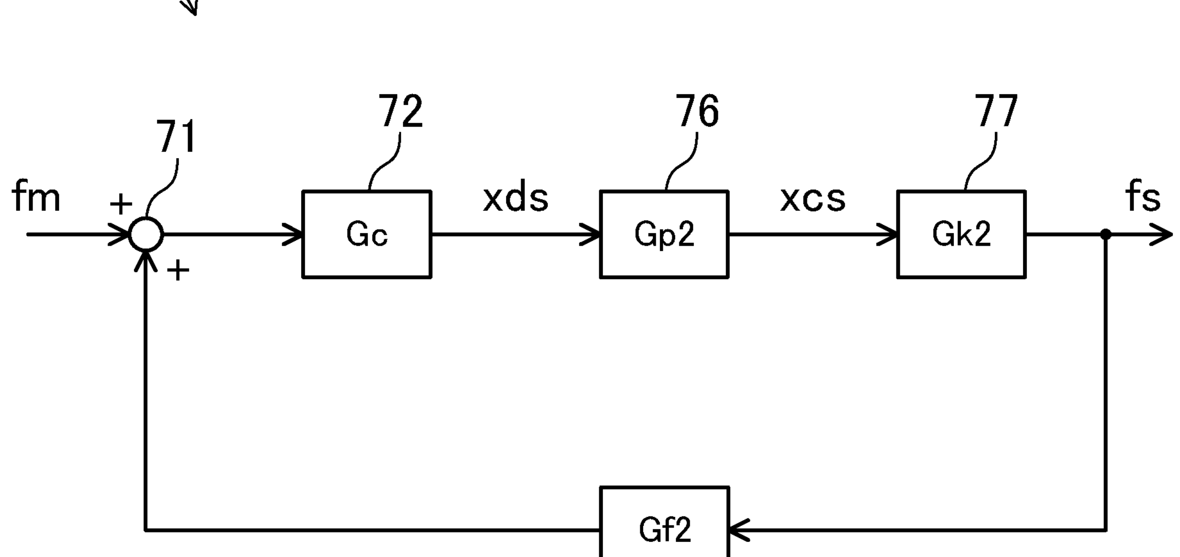

CONTROL DEVICE, ROBOT SYSTEM, ROBOT CONTROL METHOD, AND ROBOT CONTROL PROGRAM

FIELD

The technique disclosed here relates to a controller, a robot system, a robot control method, and a robot control program.

BACKGROUND

There has been known a controller that controls a robot system including a master and a slave. The controller disclosed in Patent Document 1 causes a manipulator as a slave to move in accordance with operation through a master. The manipulator applies a treatment while being in contact with an object. A force exerted on the object from the manipulator is controlled according to operation of the master by a user.

CITATION LIST

Patent Document

Patent Document 1: Japanese Patent Application Publication No. H03-162289

SUMMARY

In the force control as described above, frequency characteristics such as stability and responsiveness can change because of various factors. For example, when users change, a characteristic such as stability in the force control can change. Even for the same user, a characteristic such as stability in the force control can change in some cases. Thus, a behavior of the force control can change in accordance with a change of users and other factors.

It is therefore an object of the technique disclosed here to stabilize a behavior of force control even with a change of users and other factors.

A controller disclosed here includes: a force controller that performs force control of moving a slave in accordance with an operation force exerted on a master from a user to apply a treatment to an object and of moving the master in accordance with a reaction force exerted on the slave from the object; an estimator that estimates a dynamic characteristic of the user; and an adjuster that adjusts a control parameter of the force control in accordance with the estimated dynamic characteristic of the user such that the frequency characteristic of the force control approaches a target frequency characteristic.

A robot system disclosed here includes: the master that is operated by the user; the slave that applies a treatment to the object; and the controller.

A robot control method disclosed here includes: performing force control of moving a slave in accordance with an operation force exerted on a master from a user to apply a treatment to an object and of moving the master in accordance with a reaction force exerted on the slave from the object; estimating a dynamic characteristic of the user; and adjusting a control parameter of the force control in accordance with the estimated dynamic characteristic of the user such that the frequency characteristic of the force control approaches a target frequency characteristic.

A robot control program disclosed here is a robot control program that causes a computer to execute the function of controlling a robot system, the robot system includes a master on which an operation force is exerted from a user and a slave that applies a treatment to an object, and the program includes the functions of: performing force control of moving the slave in accordance with the operation force exerted on the master to apply the treatment to the object and of moving the master in accordance with a reaction force exerted on the slave from the object; estimating a dynamic characteristic of the user; and adjusting a control parameter of the force control in accordance with the estimated dynamic characteristic of the user such that a frequency characteristic of the force control approaches a target frequency characteristic.

The controller can stabilize a behavior of the force control even with a change of the user and other factors.

The robot system can stabilize a behavior of the force control even with a change of the user and other factors.

The robot control method can stabilize a behavior of the force control even with a change of the user and other factors.

The robot control program can stabilize a behavior of the force control even with a change of the user and other factors.

BRIEF DESCRIPTION OF THE DRAWINGS

FIG. 10 is a block schematic of a master control system including an operator.

FIG. 11 is a block schematic of a slave control system including a robot.

DESCRIPTION OF EMBODIMENTS

An exemplary embodiment will be described in detail hereinafter with reference to the drawings.

In this disclosure, work conducted by a robot do not include teaching work and confirmation and correction work of teaching. Thus, an operator 2 herein does not include a teaching pendant.

Figure 1:
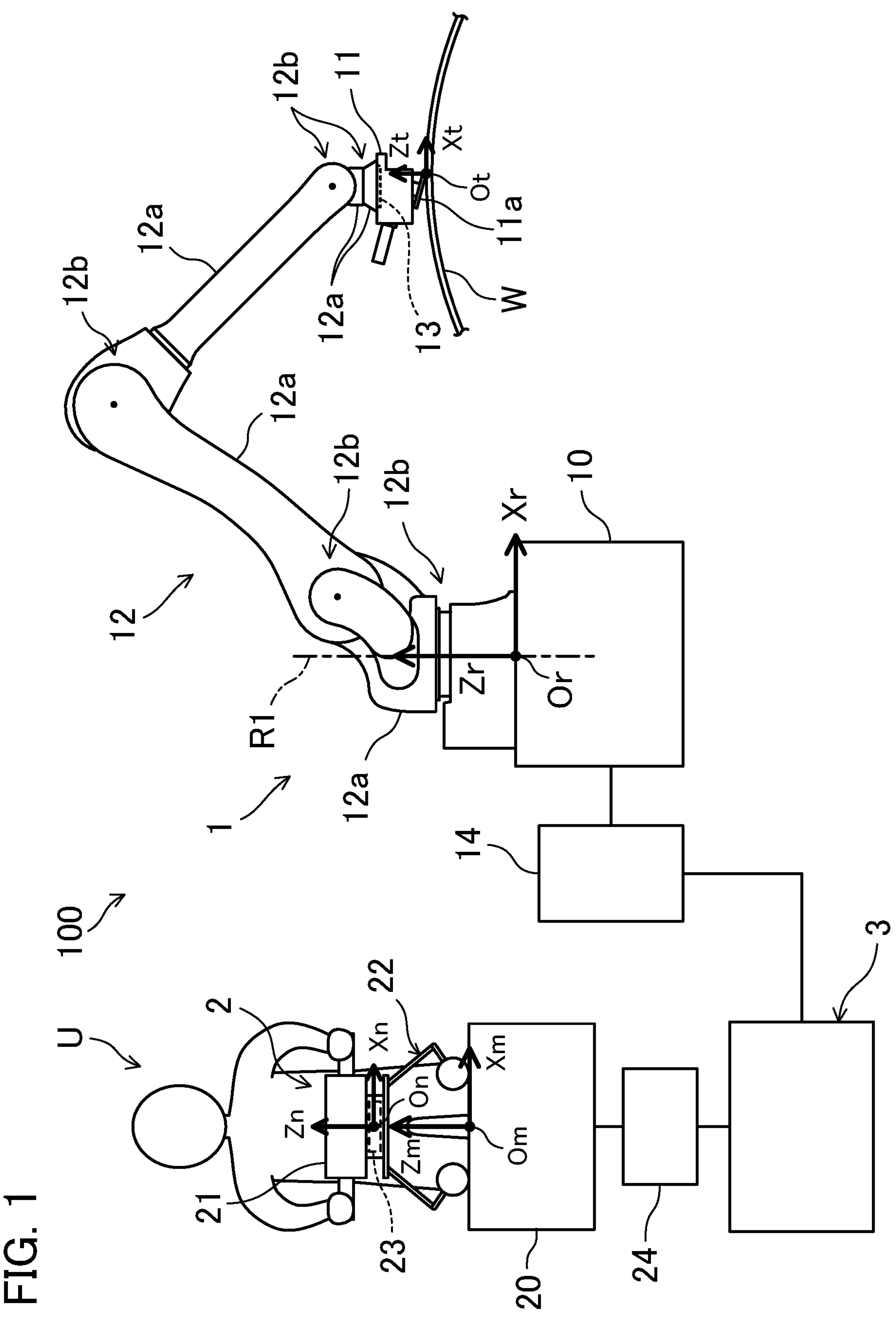
FIG. 1 is a schematic view illustrating a configuration of a robot system.

FIG. 1 is a schematic view illustrating a configuration of a robot system 100.

The robot system 100 includes a robot 1, an operator 2 that is operated by a user U, and a controller 3 that controls the robot 1. The robot system 100 constitutes a master-slave system. The operator 2 functions as a master, and the robot 1 functions as a slave. The controller 3 controls the entire robot system 100, and performs bilateral control between the robot 1 and the operator 2.

<Configuration of Robot 1>

The robot 1 is, for example, an industrial robot. The robot 1 includes an end effector 11 that applies a treatment to an object W, and a robot arm 12 that moves the end effector 11. The end effector 11 is coupled to the distal end of the robot arm 12. The robot 1 causes the robot arm 12 to operate, that is, to move, the end effector 11 so that the end effector 11 applies a treatment to the object W. The end effector 11 can apply a treatment to the object W while being in contact with the object W. The treatment is, for example, a process. The object W is, for example, a curved wall of a large tank.

The robot 1 may further include a base 10 supporting the robot arm 12, and a robot controller 14 that controls the entire robot 1.

The robot arm 12 changes a position and a posture of the end effector 11. The robot arm 12 is a vertical articulated robot arm. The robot arm 12 includes links 12*a*, joints 12*b* connecting the links 12*a*, and a servo motor 15 (see FIG. 3) that rotationally drives the joints 12*b*. For example, the link 12 located at one end (end opposite to the end effector 11) of the robot arm 12 is coupled to the base 10 through the joint 12*b* to be rotatable about a rotation axis R1 extending in the vertical direction.

The robot arm 12 may be of a horizontal articulated type, a parallel link type, a Cartesian coordinate type, a polar coordinate type, or other types.

Figure 2:
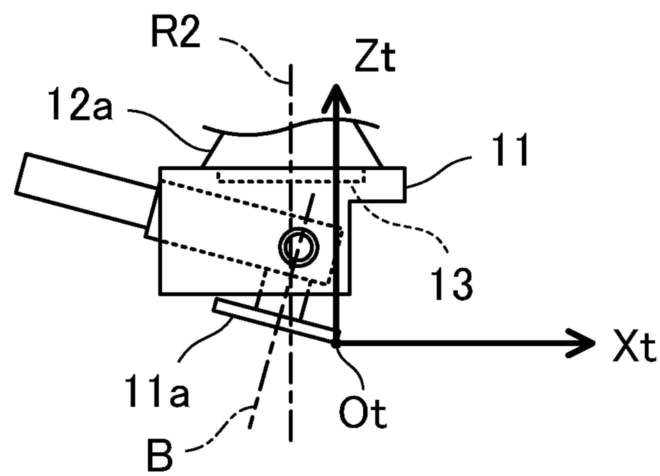
FIG. 2 is an enlarged view of an end effector.

FIG. 2 is an enlarged view of the end effector 11. The end effector 11 includes a grinding device 11*a*, and applies grinding as a treatment to the object W. The treatment applied to the object W by the end effector 11 may not be grinding, and may be cutting, polishing, or other processes.

Examples of the grinding device 11*a* include a grinder, an orbital sander, a random orbit sander, a delta sander, and a belt sander. The grinder may be of a type that rotates a discoid grindstone, a type that rotates a conical or columnar grindstone, or the like. Here, the grinding device 11*a* is a grinder of such a type that rotates a discoid grindstone.

In the robot 1, an orthogonal three-axis slave coordinate system is defined. The slave coordinate system is set with reference to the robot 1. The slave coordinate system has an Xr-axis, a Yr-axis, and a Zr-axis that are orthogonal to each other. The Xr-axis, the Yr-axis, and the Zr-axis intersect with each other at an origin Or. The origin Or is located on the upper surface of the base 10, as illustrated in FIG. 1. The Xr-axis and the Yr-axis extend in the horizontal direction, that is, extend in parallel with the upper surface of the base 10. The Zr-axis extends in the vertical direction. The Zr-axis coincides with the rotation axis R1 of the joint 12*b* coupling the robot arm 12 to the base 10. The Yr-axis extends perpendicularly to the drawing sheet in FIG. 1.

For the end effector 11, an orthogonal three-axis tool coordinate system is defined. The tool coordinate system is a coordinate system fixed to the end effector 11. As illustrated in FIG. 2, the tool coordinate system has an Xt-axis, a Yt-axis, and a Zt-axis. The Xt-axis, the Yt-axis, and the Zt-axis intersect with each other at an origin Ot. For example, the origin Ot is located at a contact point of the grinding device 11*a* with the object W. Specifically, a rotation axis B of the grindstone of the grinding device 11*a* is inclined with respect to a rotation axis R2 of the link 12*a* to which the end effector 11 is attached. A portion of the outer peripheral edge of the grindstone farthest from the link 12*a* in the direction of the rotation axis R2 is assumed as the contact point with the object W. The Zt-axis extends in parallel with the rotation axis R2. The Xt-axis is set such that the rotation axis B of the grindstone extends in an Xt-Zt plane. The Yt-axis extends perpendicularly to the drawing sheet of FIG. 2. The tool coordinate system is displaced in accordance with the position and the posture of the end effector 11 as viewed from the slave coordinate system. That is, the tool coordinate system moves together with the end effector 11 in accordance with movement of the robot arm 12.

The robot 1 may further include a contact force sensor 13 that detects a reaction force exerted on the end effector 11 from the object (hereinafter referred to as a "contact force").

In this example, the contact force sensor 13 is located between the robot arm 12 and the end effector 11 (specifically, in a coupled portion between the robot arm 12 and the end effector 11). The contact force sensor 13 detects forces along three orthogonal axes and moments about the three axes. The contact force sensor 13 is an example of a contact force detector.

The contact force detector is not limited to the contact force sensor 13. For example, the contact force sensor 13 may detect only forces in uniaxial, biaxial, or triaxial directions. Alternatively, the contact force detector may be a sensor such as a current sensor that detects a current of the servo motor 15 of the robot arm 12 or a torque sensor that detects a torque of the servo motor 15.

Figure 3:
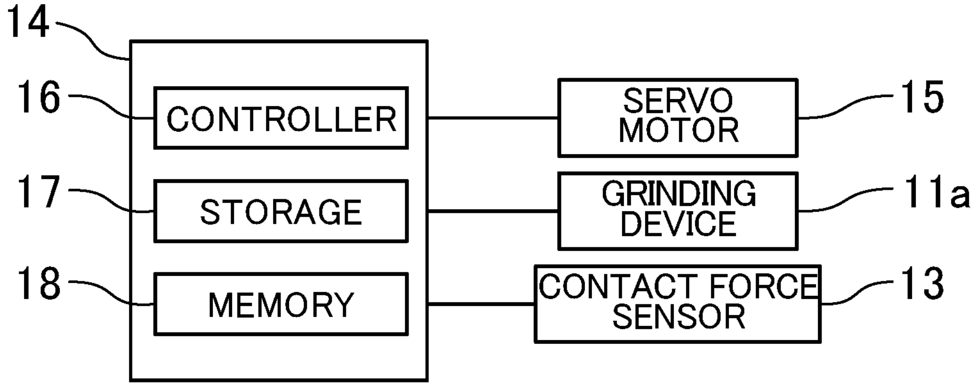
FIG. 3 illustrates a schematic hardware configuration of a robot controller.

FIG. 3 illustrates a schematic hardware configuration of the robot controller 14. The robot controller 14 controls the servo motor 15 of the robot arm 12 and the grinding device 11*a*. The robot controller 14 receives a detection signal of the contact force sensor 13. The robot controller 14 transmits and receives information, instructions, data, and others to/from the controller 3. The robot controller 14 includes a processor 16, a storage 17, and a memory 18.

The processor 16 controls the entire robot controller 14. The processor 16 performs various computations. For example, the processor 16 is a processor such as a central processing unit (CPU). The processor 16 may be a micro controller unit (MCU), a micro processor unit (MPU), a field programmable gate array (FPGA), a programmable logic controller (PLC), or the like.

The storage 17 stores programs and various types of data to be executed by the processor 16. The storage 17 is a nonvolatile memory, a hard disc drive (HDD), or a solid state drive (SSD), for example.

The memory 18 temporarily stores data or other information. For example, the memory 18 is a volatile memory.

<Configuration of Operator 2>

As illustrated in FIG. 1, the operator 2 includes a handle 21 that is operated by a user U and an operation force sensor 23 that detects an operation force exerted on the handle 21 by the user U. The operator 2 receives an input for manually operating the robot 1, and outputs operation information that is input information to the controller 3. Specifically, the user U operates the operator 2 while holding the handle 21. A force exerted on the handle 21 at this time is detected by the operation force sensor 23. The operation force detected by the operation force sensor 23 is output to the controller 3 as operation information.

The operator 2 may further include a base 20, a support 22 that is located on the base 20 and supports the handle 21, and an operation controller 24 that controls the entire operator 2. The operator 2 applies a reaction force against an operation force to the user U by control from the controller 3. Specifically, in response to an instruction from the controller 3, the operation controller 24 controls the support 22 to cause the user U to sense the reaction force.

Figure 4:
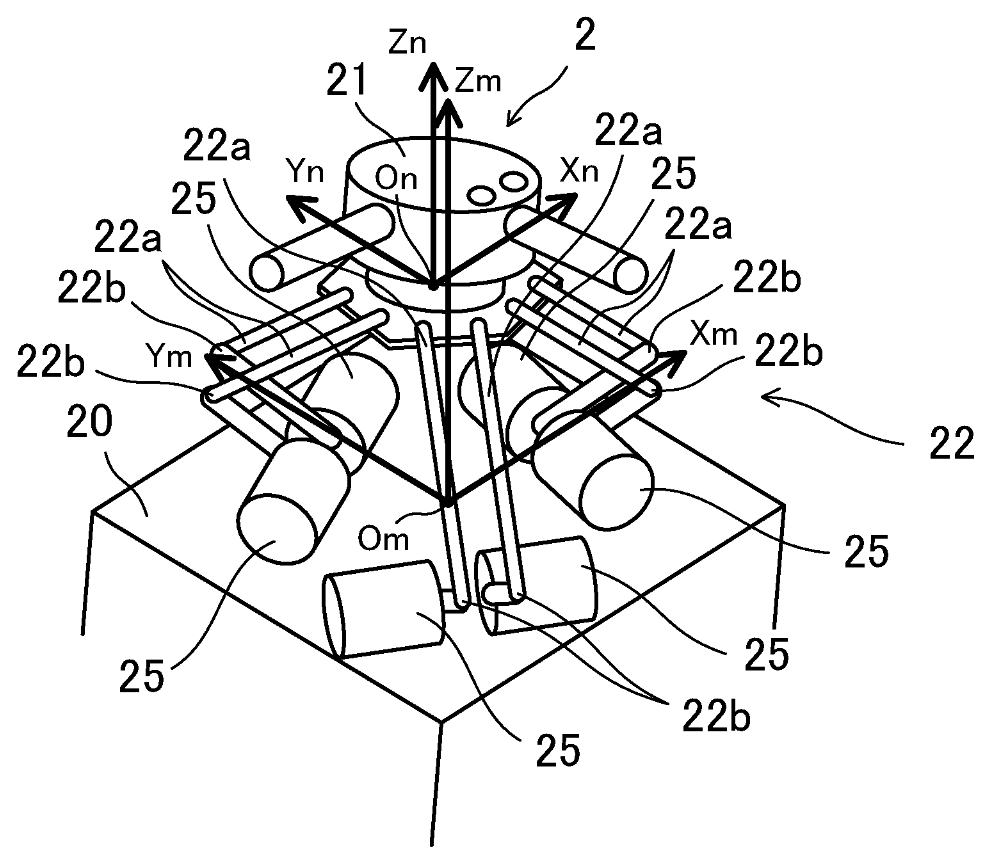
FIG. 4 is a perspective view of an operator.

FIG. 4 is a perspective view of the operator 2. The support 22 includes six arms 22*a*. Two arms 22*a* serve as one pair. That is, the support 22 includes three pairs of arms 22*a*. The three pairs of arms 22*a* radially extend from the handle 21. Each of the arms 22*a* includes a joint 22*b*. Each joint 22*b* couples two links of the arm 22*a* through a universal coupling such as a ball joint such that the two links are rotatable about the three axes orthogonal to each other. Each arm 22*a* is bendable at the joint 22*b*. One end of each arm 22*a* is coupled to the handle 21 through a universal coupling such as a ball joint such that the arm 22*a* rotates about the three axes orthogonal to each other. The other end of each arm 22*a* is coupled to the servo motor 25 through, for example, a speed reducer (not shown). The servo motor 25 is located on the base 20.

Six servo motors 25 are arranged on the upper surface of the base 20. Two servo motors 25 coupled to the two arms 22*a* of the same pair serve as one pair. The rotation axes of the two servo motors 25 of each pair extend in a straight line, that is, on the same axis. The six servo motors 25 are arranged such that the rotation axes of the three pairs of servo motors 25 are in a triangular shape.

The thus-configured support 22 supports the handle 21 such that the handle 21 is in an arbitrary posture at an arbitrary position in a three-dimensional space. The servo motors 25 rotate in accordance with the position and the posture of the handle 21. The rotation amount, that is, the rotation angle, of the servo motors 25 is uniquely determined.

In the operator 2, a master coordinate system of an orthogonal three-axis master coordinate system is defined. The master coordinate system is set with reference to the operator 2. The master coordinate system has an Xm-axis, a Ym-axis, and a Zm-axis that are orthogonal to each other. The Xm-axis, the Ym-axis, and the Zm-axis intersect with each other at an origin Om. The origin Om is located on the upper surface of the base 20. The Xm-axis and the Ym-axis extend in the horizontal direction, that is, extend in parallel with the upper surface of the base 20. The Zm-axis extends in the vertical direction. The Zm-axis passes through the center of gravity of the triangle defined by the rotation axes of the three pairs of servo motors 25. The master coordinate system is a coordinate system fixed to the base 20 of the operator 2.

For the handle 21, an orthogonal three-axis operation coordinate system is defined. The operation coordinate system is a coordinate system fixed to the handle 21. The operation coordinate system has an Xn-axis, a Yn-axis, and a Zn-axis that are orthogonal to each other. The Xn-axis, the Yn-axis, and the Zn-axis are orthogonal to each other at an origin On. For example, the origin On is located at the center of the handle 21. The operation coordinate system is displaced in accordance with the position and the posture of the handle 21 as viewed from the master coordinate system. That is, the operation coordinate system moves together with the handle 21 in accordance with movement of the handle 21. In this example, the operation coordinate system corresponds to the tool coordinate system.

In this example, the operation force sensor 23 is located between the handle 21 and the support 22 (specifically, in a coupled portion between the handle 21 and the support 22) as illustrated in FIG. 1. The operation force sensor 23 detects forces along three orthogonal axes and moments about the three axes. The operation force sensor 23 is an example of an operation force detector.

The operation force detector is not limited to the operation force sensor 23. For example, the operation force sensor 23 may detect only forces in uniaxial, biaxial, or triaxial directions. Alternatively, the operation force detector may be a sensor such as a current sensor that detects a current of the servo motor 25 of the support 22 or a torque sensor that detects a torque of the servo motor 25.

Figure 5:
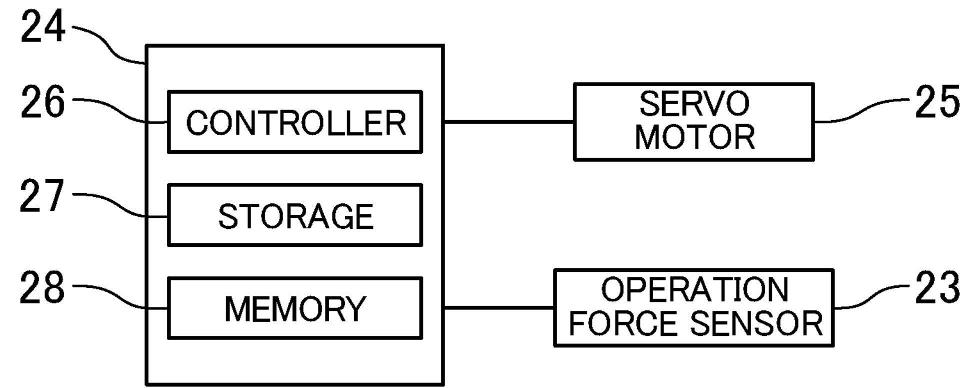
FIG. 5 illustrates a schematic hardware configuration of an operation controller.

FIG. 5 illustrates a schematic hardware configuration of the operation controller 24. The operation controller 24 causes the support 22 to operate by controlling the servo motor 25. The operation controller 24 receives a detection signal of the operating force sensor 23. The operation controller 24 transmits and receives information, instructions, data, and others to/from the controller 3. The operation controller 24 includes the processor 26, the storage 27, and the memory 28.

The processor 26 controls the entire operation controller 24. The processor 26 performs various computations. For example, the processor 26 is a processor such as a central processing unit (CPU). The processor 26 may be a micro controller unit (MCU), a micro processor unit (MPU), a field programmable gate array (FPGA), a programmable logic controller (PLC), or the like.

The storage 27 stores programs and various types of data to be executed by the processor 26. The storage 27 is a nonvolatile memory, a hard disc drive (HDD), or a solid state drive (SSD), for example.

The memory 28 temporarily stores data or other information. For example, the memory 28 is a volatile memory.

<Configuration of Control Device 3>

The controller 3 controls the robot 1 and the operator 2. The controller 3 outputs a slave instruction, which is an instruction to the robot 1, to the robot 1 such that the end effector 11 moves in accordance with operation information input through the operator 2. The controller 3 controls the robot arm 12 in accordance with operation through the operator 2 to thereby cause the end effector 11 to apply a treatment to the object W. The controller 3 outputs a master instruction, which is an instruction to the operator 2, to the operator 2 such that the handle 21 moves in accordance with a reaction force exerted on the robot 1 from the object W. The controller 3 controls the support 22 to thereby present the reaction force exerted on the end effector 11 from the object W to the user U.

Figure 6:
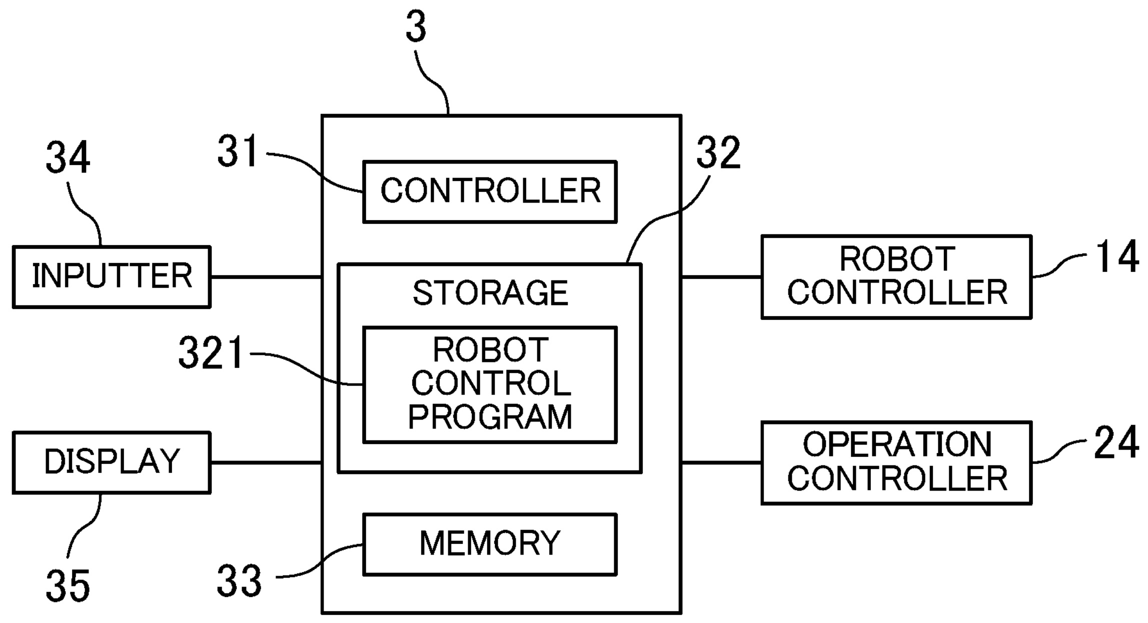
FIG. 6 illustrates a schematic hardware configuration of a controller.

FIG. 6 illustrates a schematic hardware configuration of the controller 3. The controller 3 transmits and receives information, instructions, data, and others to/from the robot controller 14 and the operation controller 24. The controller 3 includes a processor 31, a storage 32, and a memory 33.

The processor 31 controls the entire controller 3. The processor 31 performs various computations. For example, the processor 31 is a processor such as a central processing unit (CPU). The processor 31 may be a micro controller unit (MCU), a micro processor unit (MPU), a field programmable gate array (FPGA), a programmable logic controller (PLC), or the like.

The storage 32 stores programs and various types of data to be executed by the processor 31. The storage 32 is a nonvolatile memory, a hard disc drive (HDD), or a solid state drive (SSD), for example. For example, the storage 32 stores a robot control program 321.

The robot control program 321 is a program that causes the processor 31 as a computer to execute the function of controlling the robot system 100.

The memory 33 temporarily stores data or other information. For example, the memory 33 is a volatile memory.

The controller 3 includes an inputter 34 on which the user U performs an input operation, and a display 35 that enables information presentation to the user U.

Figure 7:
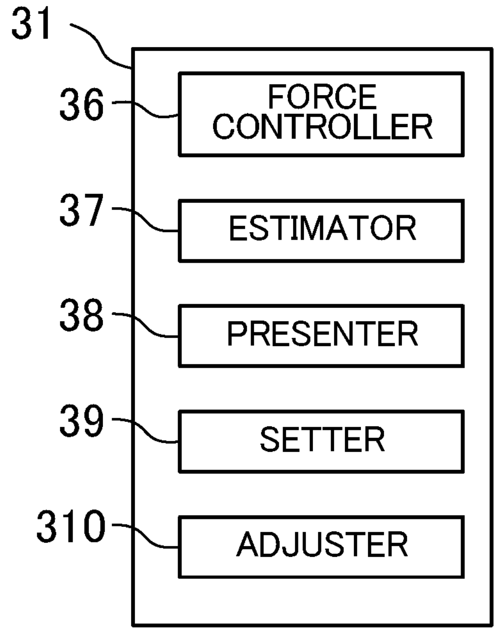
FIG. 7 is a functional block diagram of a processor.

FIG. 7 is a functional block diagram of the processor 31. The processor 31 reads the robot control program 321 from the storage 32 and develops the program 321 to the memory

33 to thereby operate various functions. Specifically, the processor 31 functions as a force controller 36, an estimator 37, a presenter 38, a setter 39, and an adjuster 310.

The force controller 36 performs force control. The force control refers to control of moving the robot 1 in accordance with an operation force exerted on the operator 2 from the user to the operator 2 to apply a treatment to the object W and of moving the operator 2 in accordance with a reaction force exerted on the robot 1 from the object W. Specifically, the force controller 36 performs bilateral control between the robot 1 and the operator 2. The force controller 36 generates a slave instruction to the robot 1 and a master instruction to the operator 2, based on the operation force input to the operator 2 and the reaction force exerted on the robot 1 from the object W. The force controller 36 outputs the slave instruction to the robot 1 and the master instruction to the operator 2 to thereby control the robot 1 and the operator 2.

The estimator 37 estimates a dynamic characteristic of the user U. Specifically, the estimator 37 estimates the dynamic characteristic of the user U by using a user model that is a dynamic model of the user U. The estimator 37 also estimates a dynamic characteristic of the object W, a dynamic characteristic of the robot 1, and a dynamic characteristic of the operator 2. Specifically, the estimator 37 estimates the dynamic characteristic of the object W by using an object model that is a dynamic model of the object W. The estimator 37 estimates the dynamic characteristic of the robot 1 by using a slave model that is a dynamic model of the robot 1. The estimator 37 estimates the dynamic characteristic of the operator 2 by using a master model that is a dynamic model of the operator 2. The estimator 37 estimates dynamic characteristics of the user U, object W, the robot 1, and the operator 2 while the force controller 36 performs force control of the robot 1 and the operator 2.

The presenter 38 obtains a frequency characteristic of the force control and presents the obtained frequency characteristic. Specifically, the presenter 38 obtains the frequency characteristic of force control while the force controller 36 performs force control of the robot 1 and the operator 2. The presenter 38 obtains a frequency characteristic by using the dynamic characteristics of the user U, the object W, the robot 1, and the operator 2 estimated by the estimator 37. The presenter 38 expresses the frequency characteristic in the form of a predetermined evaluation value. The presenter 38 causes the display 35 to display the evaluation value.

The setter 39 receives an input of a target frequency characteristic of the force control and sets the target frequency characteristic. Specifically, the setter 39 receives an input of the target frequency characteristic from the user U through the inputter 34. For example, the setter 39 also uses an evaluation value of the frequency characteristic in the input of the target frequency characteristic. That is, the setter 39 receives the input of an evaluation value as a target to thereby substantially receive an input of the target frequency characteristic.

The adjuster 310 adjusts a control parameter of the force control such that the frequency characteristic of the force control approaches the target frequency characteristic set by the setter 39. In this example, the adjuster 310 adjusts the control parameter in accordance with the dynamic characteristic of at least one of the user U, the object W, the robot 1, or the operator 2 such that the frequency characteristic of the force control approaches the target frequency characteristic.

These functional blocks will be described in further details.

<Force Control in Robot System>

Figure 8:
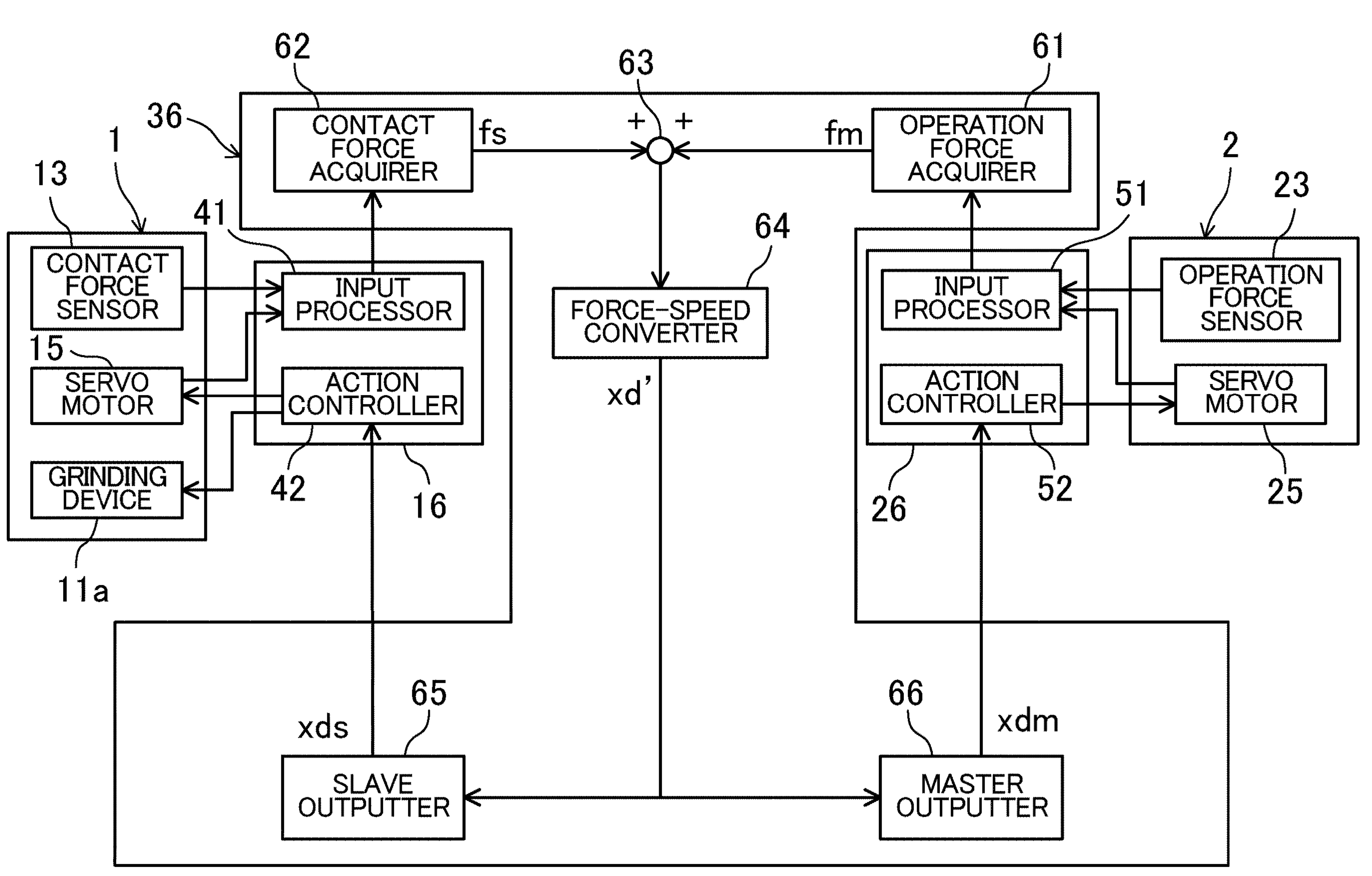
FIG. 8 is a block diagram in which a force controller is disassembled to detailed functions.

FIG. 8 is a block diagram in which the force controller 36 is disassembled to detailed functions. FIG. 8 also shows functional blocks of the processor 16 of the robot controller 14 and the processor 26 of the operation controller 24.

The processor 16 of the robot controller 14 reads programs from the storage 17 and develops the programs to the memory 18 to thereby operate various functions. Specifically, the processor 16 functions as an input processor 41 and an action controller 42.

The input processor 41 outputs information, data, instructions, and others received from the contact force sensor 13 and the servo motor 15 to the controller 3. Specifically, the input processor 41 receives detection signals of forces in six axes from the contact force sensor 13 and outputs the detection signal to the controller 3 as operation information. The input processor 41 receives detection signals of a rotation sensor (e.g., encoder) and a current sensor from the servo motor 15. The input processor 41 outputs the detection signals to the action controller 42 for feedback control of the robot arm 12 by the action controller 42. The input processor 41 outputs the detection signals as positional information of the robot arm 12 to the controller 3.

The action controller 42 receives a slave instruction (specifically, an instruction position xds) from the controller 3 and generates a control instruction for moving the robot arm 12 in accordance with the slave instruction. The action controller 42 outputs the control instruction to the servo motor 15, causes the robot arm 12 to operate, and causes the grinding device **11*a* to move to a position corresponding to the instructed position. At this time, the action controller 42 performs feedback control on movement of the robot arm 12 based on a detection signal of a rotation sensor and/or a current sensor of the servo motor 15 from the input processor 41. The action controller 42 outputs a control instruction to the grinding device 11*a* and causes the grinding device 11*a* to operate. Accordingly, the grinding device 11*a*** grinds the object W.

The processor 26 of the operation controller 24 reads programs from the storage 27 and develops the programs to the memory 28 to thereby operate various functions. Specifically, the processor 26 functions as an input processor 51 and an action controller 52.

The input processor 51 outputs information, data, instructions, and others received from the operating force sensor 23 to the controller 3. Specifically, the input processor 51 receives detection signals of forces in six axes from the operating force sensor 23 and outputs the detection signals to the controller 3 as reaction force information. The input processor 51 receives detection signals of a rotation sensor (e.g., encoder) and a current sensor from the servo motor 25. The input processor 51 outputs the detection signals to the action controller 52 for feedback control of the support 22 by the action controller 52.

The action controller 52 receives a master instruction (specifically, instruction position xdm) from the controller 3, and generates a control instruction for causing the support 22 to operate in accordance with the master instruction. The action controller 52 outputs the control instruction to the servo motor 25, operates the support 22, and moves the handle 21 to a position corresponding to the instructed position. At this time, the action controller 52 performs feedback control on operation of the support 22 based on a detection signal of a rotation sensor and/or a current sensor of the servo motor 25 from the input processor 51. Accordingly, a reaction force is applied to an operating force exerted on the handle 21 by the user U. Consequently, the user U can operate the handle 21, while sensing a pseudo reaction force of the object W from the handle 21.

The processor 31 of the controller 3 reads the robot control program 321 from the storage 32 and develops the program 321 to the memory 33 to thereby operate various functions. Specifically, the processor 31 functions as an operation force acquirer 61, a contact force acquirer 62, an adder 63, a force-speed converter 64, a slave outputter 65, and a master outputter 66. The operation force acquirer 61, the contact force acquirer 62, the adder 63, the force-speed converter 64, the slave outputter 65, and the master outputter 66 are parts of the force controller 36. With these functions, the controller 3 generates a slave instruction and a master instruction in accordance with operation information and reaction force information.

The operating force acquirer 61 receives a detection signal of the operating force sensor 23 through the input processor 51, and acquires an operating force fm based on the detection signal. For example, the operation force acquirer 61 obtains a force exerted on the handle 21 and expressed by an operation coordinate system as an operation force fm, from the detection signal of the operation force sensor 23. The operation force acquirer 61 inputs the operation force fm to the adder 63.

The contact force acquirer 62 receives a detection signal of the contact force sensor 13 through the input processor 41, and acquires a contact force fs based on the detection signal. For example, the contact force acquirer 62 obtains a force exerted on a contact point with the object W in the end effector 11 and expressed by a tool coordinate system as a contact force fs, from the detection signal of the contact force sensor 13 The contact force acquirer 62 inputs the contact force fs to the adder 63.

The adder 63 calculates a sum of the operating force fm input from the operating force acquirer 61 and the contact force fs input from the contact force acquirer 62. In this example, since the operating force fm and the contact force fs are in opposite directions, the operating force fm and the contact force fs have different positive/negative signs. That is, an absolute value of a resultant force fm+fs that is the sum of the operation force fm and the contact force fs is smaller than an absolute value of the operation force fm.

The force-speed converter 64 converts the resultant force fm+fs to an instruction speed xd'. The force-speed converter 64 calculates an instruction speed xd' of an object when the resultant force fm+fs is exerted thereon, by using a motion model based on a motion equation including an inertial coefficient and a viscosity coefficient (damper coefficient). Specifically, the force-speed converter 64 calculates the instructed speed xd' based on the motion equation:

[Eq. 1]

$$md \cdot xd'' + cd \cdot xd' = fm + fs \tag{1}$$

where xd is an object position, md is an inertial coefficient, cd is a viscosity coefficient, fm is an operation force, and fs is a contact force. In the equation “'” indicates one-time differentiation, and “''” indicates two-time differentiation.

Equation (1) is a linear differential equation, and when Equation (1) is solved for the instruction speed xd', xd'=V (fm, fs) is given. V (fm, fs) is a function having fm and fs as variables and md, cd, etc. as constants. In addition, md and cd are control parameters in force control.

The function V (fm, fs) is stored in the storage 32. The force-speed converter 64 reads the function V (fm, fs) from the storage 32 and obtains the instruction speed xd'. The force-speed converter 64 outputs the obtained instruction speed xd' to the slave outputter 65 and the master outputter 66.

The slave outputter 65 generates a slave instruction based on the instruction speed xd'. Specifically, the slave outputter 65 converts the instruction speed xd' to an instruction position xds of the end effector 11. The instruction position xds is a position on the tool coordinate system. The instruction position xds is the slave instruction. For example, in a case where a ratio of the amount of movement of the robot 1 to the amount of movement of the operator 2 is set, the slave outputter 65 obtains an instruction position xds by multiplying the instruction position obtained from the instruction speed xd' in accordance with the movement ratio. The slave outputter 65 outputs the instruction position xds to the robot controller 14, specifically, the action controller 42.

The action controller 42 generates a control instruction to the servo motor 15 for enabling movement of the end effector 11 to the instruction position xds. The action controller 42 outputs the generated control instruction to the servo motor 15 to cause the robot arm 12 to operate so that the end effector 11 moves to a position corresponding to the instruction position xds.

The master outputter 66 generates a master instruction based on the instruction speed xd'. Specifically, the master outputter 66 converts the instruction speed xd' to an instruction position xdm of the handle 21. The instruction position xdm is a position on the operation coordinate system. The instruction position xdm is the master instruction. The master outputter 66 outputs the instruction position xdm to the operation controller 24, specifically, the action controller 52.

The action controller 52 generates a control instruction to the servo motor 25 for enabling movement of the handle 21 to the instruction position xdm. The action controller 52 outputs the generated control instruction to the servo motor 25 to thereby operate the support 22 and move the handle 21 to a position corresponding to the instruction position xdm.

Next, an action of the robot system 100 in force control will be described. For example, the user U operates the operator 2 to thereby cause the robot 1 to perform grinding on the object W.

First, the controller 3 acquires an operation force and a contact force. When the user U operates the operator 2, the operation force sensor 23 detects an operation force exerted from the user U through the handle 21. The operation force detected by the operation force sensor 23 is input to the controller 3 as a detection signal by the input processor 51. At this time, the contact force detected by the contact force sensor 13 of the robot 1 is input to the controller 3 as the detection signal by the input processor 41.

In the controller 3, the operation force acquirer 61 inputs an operation force fm based on the detection signal to the adder 63. The contact force acquirer 62 inputs a contact force fs based on the detection signal to the adder 63.

Subsequently, the controller 3 generates the instruction speed xd' of the master instruction and the slave instruction. Specifically, the adder 63 inputs the resultant force fm+fs to the force-speed converter 64. The force-speed converter 64 obtains the instruction speed xd' from the resultant force fm+fs by using the function V (fm, fs).

Thereafter, the slave outputter 65 generates the instruction position xds (i.e., slave instruction) of the end effector 11 from the instruction speed xd'. In parallel with this process, the master outputter 66 generates the instruction position xdm (i.e., master instruction) of the handle 21. The slave outputter 65 outputs the instruction position xds to the robot 1, whereas the master outputter 66 outputs the instruction position xdm to the operator 2. In this manner, the robot 1 operates in accordance with the instruction position xds and performs gridding. In parallel with this process, the operator 2 operates in accordance with the instruction position xdm and presents a reaction force to the user U.

<Presentation of Frequency Characteristic>

Figure 9:
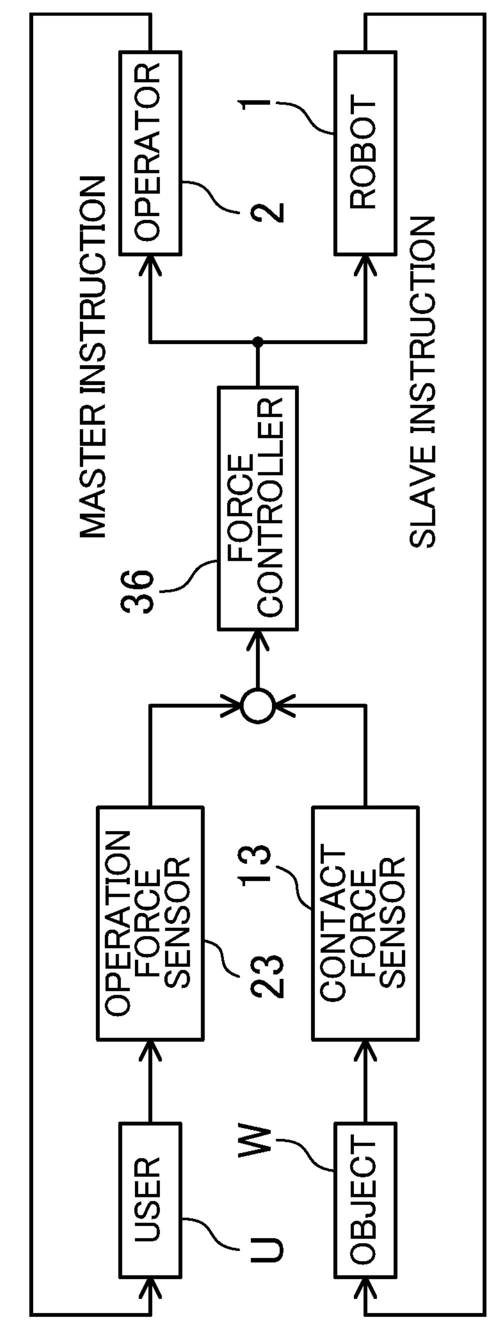
FIG. 9 is a block schematic of the entire robot system.

The presenter 38 obtains a frequency characteristic of such force control and presents the obtained frequency characteristic. The frequency characteristic of the force control is affected by various elements in the robot system 100. FIG. 9 is a block schematic of the entire robot system 100. As described above, in the robot system 100, the user U holds the operator 2 and operates the operator 2. The operation force fm from the user is input to the controller 3 through the operation force sensor 23. On the other hand, the end effector 11 is in contact with the object W. The contact force fs at this time is input to the controller 3 through the input contact force sensor 13. The controller 3 receives the resultant force fm+fs. The force controller 36 of the controller 3 generates a slave instruction and a master instruction from the resultant force fm+fs. The robot controller 14 controls the position of the robot 1 in accordance with the slave instruction, and the end effector 11 performs a treatment on the object W. In parallel with this process, the operation controller 24 controls the position of the operator 2 in accordance with the master instruction, and the handle 21 presents a reaction force to the user U.

Here, since the handle 21 is held by the user, movement of the handle 21 is affected by a dynamic characteristic, for example, mechanical impedance, of the user U. Characteristics such as stiffness and mechanical resistance of the user U differ among individuals. Even for the same user U, characteristics such as stiffness and mechanical resistance of the user U can change depending on the posture (including the state of arms such as the degree of bending of the arms) of the user U. Thus, movement of the handle 21 is affected by the dynamic characteristic of the user U.

Similarly, since the end effector 11 of the robot 1 is in contact with the object W, movement of the end effector 11 is affected by a dynamic characteristic, for example, mechanical impedance, of the object W. Characteristics such as stiffness and mechanical resistance of the object W differ among individuals. Even for the same object W, characteristics such as stiffness and mechanical resistance of the object W can change depending on situations of a treatment. Thus, movement of the end effector 11 is affected by the dynamic characteristic of the object W.

The shape, posture, and so forth of the support 22 change depending on control by the controller 3 and operation of the handle 21 by the user U. The shape, posture, and so forth of the support 22 can affect frequency response of the operator 2. The dynamic characteristic, such as frequency response, of the operator 2 affects movement of the operator 2 in the force control. That is, movement of the operator 2 is affected by the dynamic characteristic of the operator 2.

Similarly, the shape, posture, and so forth of the robot arm 12 change depending on control of the controller 3. The shape, posture, and so forth of the robot arm 12 can affect frequency response of the robot 1. A dynamic characteristic of the robot 1, such as frequency response, affects an action of the robot 1 in force control. That is, an action of the robot 1 is affected by the dynamic characteristic of the robot 1.

The presenter 38 obtains a frequency characteristic of the force control based on a transfer function of a control system including a dynamic model representing a dynamic characteristic of the user U and other characteristics. FIG. 10 is a block schematic of a master control system 7A including the operator 2. FIG. 11 is a block schematic of a slave control system 7B including the robot 1.

As illustrated in FIG. 10, the master control system 7A includes a resultant force calculation element 71, a force control element 72, an operator element 73, a user element 74, and an operation force sensor element 75.

The resultant force calculation element 71 calculates the resultant force fm+fs of the operation force fm and the contact force fs. In FIG. 10, although the sign of the contact force fx input to the resultant force calculation element 71 is positive, since the operation force fm and the contact force fs are in opposite directions, the contact force fs is substantially subtracted from the operation force fm in the resultant force calculation element 71.

The force control element 72 calculates the instruction position xds of the end effector 11 and the instruction position xdm of the handle 21 from the resultant force fm+fs. The force control element 72 corresponds to the force-speed converter 64, the slave outputter 65, and the master outputter 66 of the controller 3. The transfer function Gc of the force control element 72 is expressed by Equation (2):

[Eq. 2]

$$Gc = \frac{1}{md \cdot s^2 + cd \cdot s} \tag{2}$$

where md is an inertial coefficient in motion equation (1), and cd is a viscosity coefficient. That is, md and cd are control parameters of force control.

The operator element 73 converts the instruction position xdm to a current position xcm of the actual handle 21. That is, the operator element 73 corresponds to the operator 2, and is expressed by a master model that is a dynamic model of the operator 2. The master model represents a dynamic characteristic of the operator 2, specifically, frequency response of the operator 2. For example, the master model is a first-order lag system model. A transfer function Gp1 of the operator element 73 is expressed by Equation (3):

[Eq. 3]

$$Gp1 = \frac{1}{1 + Tc \cdot s} \tag{3}$$

where Tc is a time constant of the master model.

The user element 74 converts the current position xcm to the operation force fm. That is, the user element 74 corresponds to the user U, and is expressed by a user model that is a dynamic model of the user U. The user model represents a dynamic characteristic of the user U. Specifically, the user model includes a mechanical impedance of the user U, that is, a stiffness coefficient ku and a viscosity coefficient cu. For example, when the user model is approximated to a spring-damper model, the user model is expressed by Equation (4) below. In this case, a transfer function Gk1 of the user element 74 is expressed by Equation (5) below.

[Eq. 4]

$$fm = ku \cdot xcm + cu \cdot xcm' \quad (4)$$

$$Gk1 = ku + cu \cdot s \quad (5)$$

The operation force sensor element 75 removes noise of the operation force fm detected by the operation force sensor 23. The operation force sensor element 75 corresponds to a noise removing filter, for example, a low-pass filter. The operation force sensor element 75 is expressed by a first-order lag system model. A transfer function Gf1 of the operation force sensor element 75 is expressed by Equation (6):

[Eq. 5]

$$Gf1 = \frac{1}{1 + Tf1 \cdot s} \quad (6)$$

where Tf1 is a time constant of a model of the operation force sensor 23.

A open-loop transfer function Gm(jω) of this master control system 7A is expressed by Equation (7):

[Eq. 6]

$$Gm(j\omega) = Gc \cdot Gp1 \cdot Gk1 \cdot Gf1 \quad (7)$$

From the open-loop transfer function Gm(jω), a frequency characteristic of the master control system 7A can be obtained. For example, from the open-loop transfer function Gm(jω), a gain crossover frequency ωcg1 and a gain margin gm1 in a Bode diagram can be obtained. The gain crossover frequency ωcg1 and the gain margin gm1 represent a frequency characteristic of the master control system 7A. The gain crossover frequency ωcg1 is related to responsiveness. The gain margin gm1 is related to stability.

On the other hand, as illustrated in FIG. 11, the slave control system 7B includes a resultant force calculation element 71, a force control element 72, a robot element 76, an object element 77, and a contact force sensor element 78.

The resultant force calculation element 71 and the force control element 72 are similar to those in the master control system 7A.

The robot element 76 converts the instruction position xds to a current position xcs of the actual end effector 11. That is, the robot element 76 corresponds to the robot 1, and is expressed by a slave model that is a dynamic model of the robot 1. The slave model represents a dynamic characteristic of the robot 1, specifically, frequency response of the robot 1. For example, the slave model is a first-order lag system model. A transfer function Gp2 of the robot element 76 is expressed by Equation (8):

[Eq. 7]

$$Gp2 = \frac{1}{1 + Tr \cdot s} \quad (8)$$

where Tr is a time constant of the slave model.

The object element 77 converts the current position xcs to a contact force fs. That is, the object element 77 corresponds to the object W, and is expressed by an object model that is a dynamic model of the object W. The object model represents a dynamic characteristic of the object W. Specifically, the object model includes a mechanical impedance of the object W, that is, a stiffness coefficient kw and a viscosity coefficient cw. For example, when the object model is approximated to a spring-damper model, the object model is expressed by Equation (9) below. In this case, a transfer function Gk2 of the object element 77 is expressed by Equation (10) below.

[Eq. 8]

$$fs = kw \cdot xcs + cw \cdot xcs' \quad (9)$$

$$Gk2 = kw + cw \cdot s \quad (10)$$

The contact force sensor element 78 removes noise of the contact force fs detected by the contact force sensor 13. The contact force sensor element 78 corresponds to a noise removing filter, for example, a low-pass filter. The contact force sensor element 78 is expressed by a first-order lag system model. A transfer function Gf2 of the contact force sensor element 78 is expressed by Equation (11) below.

[Eq. 9]

$$Gf2 = \frac{1}{1 + Tf2 \cdot s} \quad (11)$$

were Tf2 is a time constant of a model of the contact force sensor 13.

An open-loop transfer function Gs(jω) of this slave control system 7B is expressed by Equation (12):

[Eq. 10]

$$Gs(j\omega) = Gc \cdot Gp2 \cdot Gk2 \cdot Gf2 \quad (12)$$

From the open-loop transfer function Gs(jω), a frequency characteristic of the slave control system 7B can be obtained. For example, from the open-loop transfer function Gs(jω), a gain crossover frequency ωcg2 and a gain margin gm2 in a Bode diagram can be obtained. The gain crossover frequency ωcg2 and the gain margin gm2 represent a frequency characteristic of the slave control system 7B. The gain crossover frequency @cg2 is related to responsiveness. The gain margin gm2 is related to stability.

The presenter 38 obtains the gain crossover frequency ωcg1 and the gain margin gm1 of the master control system 7A and the gain crossover frequency ωcg2 and the gain margin gm2 of the slave control system 7B (hereinafter also referred to as the "gain crossover frequency ωcg1 and other parameters"), and expresses a frequency characteristic of the force control by using the gain crossover frequency ωcg1 and other parameters.

The presenter 38 expresses a frequency characteristic of the force control by a first evaluation value related to responsiveness and a second evaluation value related to stability. For example, the presenter 38 refers to the first evaluation value as "speed" and expresses the first evaluation value ranging from 0 to 100%. The presenter 38 refers to the second evaluation value as "vibration resistance" and expresses the second evaluation value ranging from 0 to 100%. The first evaluation value and the second evaluation value have relative relationship. That is, when the first evaluation value is high, the second evaluation value is low. On the other hand, when the first evaluation value is low, the first evaluation value is high.

A speed of 0% means low responsiveness, whereas a speed of 100% means high responsiveness. For example, when the gain crossover frequency is a predetermined first frequency or less, the speed is 0%. When the gain crossover frequency is a second frequency (>first frequency) or more, the speed is 100%. When the gain crossover frequency is larger than the first frequency and smaller than the second frequency, the speed is larger than 0% and smaller than 100%. More specifically, when the gain crossover frequency is close to the first frequency, the speed is close to 0%. When the gain crossover frequency is close to the second frequency, the speed is close to 100%.

A vibration resistance of 0% means low stability, whereas a vibration resistance of 100% means high stability. For example, when the gain margin is a predetermined first value or less, the vibration resistance is 0%. When the gain margin is a second value (>first value) or more, the vibration resistance is 100%. When the gain margin is larger than the first value and smaller than the second value, the vibration resistance is larger than 0% and smaller than 100%. More specifically, when the gain margin is close to the first value, the vibration resistance is close to 0%. When the gain margin is close to the second value, the vibration resistance is close to 100%.

In regard to the master control system 7A, the presenter 38 obtains the speed from the gain crossover frequency ωcg1 and the vibration resistance from the gain margin gm1. In regard to the slave control system 7B, the presenter 38 obtains the speed from the gain crossover frequency ωcg2 and the vibration resistance from the gain margin gm2. That is, the presenter 38 obtains the speed and the vibration resistance of the master control system 7A and the speed and the vibration resistance of the slave control system 7B.

The presenter 38 causes the display 35 to display the thus-obtained speed and vibration resistance of the master control system 7A and the thus-obtained speed and the vibration resistance of the slave control system 7B. In this manner, the user U is allowed to know a frequency characteristic of the master control system 7A in which dynamic characteristics of the user U and the operator 2 are taken into consideration and a frequency characteristic of the slave control system 7B in which dynamic characteristics of the object W and the robot 1 are taken into consideration.

<Estimation of Dynamic Characteristic>

It should be noted that a dynamic characteristic of each of the object W, the user U, the robot 1, and the operator 2 is not constant. For example, the stiffness coefficient kw and the viscosity coefficient cw of the object W can vary depending on the individual difference among objects W, the treatment place on the object W, and so forth. The stiffness coefficient ku and the viscosity coefficient cu of the user U can vary depending on the individual difference among users U, the posture of the user U, and so forth. The time constant Tr of the robot 1 can vary depending on the machine difference among robot arms 12, the shape of the robot arm 12, and so forth. The time constant Tc of the operator 2 can vary depending on the machine difference among supports 22, the shape of the support 22, and so forth.

For this reason, the estimator 37 estimates dynamic characteristics of the object W, the user U, the robot 1, and the operator 2. The presenter 38 derives the gain crossover frequency ωcg1 and other parameters, and further the frequency characteristic of the force control, by using the estimated dynamic characteristics of the object W, the user U, the robot 1, and the operator 2.

In this example, it is assumed that the time constant Tf1 of the operation force sensor 23 and the time constant Tf2 of the contact force sensor 13 are constant. It should be noted that the estimator 37 may further estimate the time constant Tf1 and the time constant Tf2 as dynamic characteristics of the operation force sensor 23 and the contact force sensor 13. In this case, in deriving the gain crossover frequency ωcg1 and other parameters, the presenter 38 also considers the estimated dynamic characteristics of the operation force sensor 23 and the contact force sensor 13.

Specifically, during execution of the force control, the estimator 37 estimates the stiffness coefficient kw and the viscosity coefficient cw of the object W, the stiffness coefficient ku and the viscosity coefficient cu of the user U, the time constant Tr of the robot 1, and the time constant Tc of the operator 2.

The estimator 37 assumes a user model expressed by Equation (13) below by using the mechanical impedance of the user U, that is, the stiffness coefficient ku and the viscosity coefficient cu.

[Eq. 11]

$$fm = ku \cdot xm + cu \cdot xm' \tag{13}$$

where xm is a displacement amount of the handle 21.

From this user model, the estimator 37 sets θ and ξ as expressed by Equation (14), and estimates θ moment by moment during the force control by a forgetting factor recursive least square method expressed by Equations (15) and (16). In Equation (15), y(k) is substituted by fm of Equation (13).

[Eq. 12]

$$\theta = \begin{bmatrix} ku \\ cu \end{bmatrix}, \xi = \begin{bmatrix} xm \\ xm' \end{bmatrix} \tag{14}$$

[Eq. 13]

$$\theta(k) = \theta(k-1) - \frac{\xi(k)\cdot\theta(k-1) - y(k)}{\lambda + \xi(k)\cdot\Gamma(k-1)\cdot\xi(k)}\cdot\Gamma(k-1)\cdot\xi(k) \tag{15}$$

$$\Gamma(k) = \frac{1}{\lambda}\cdot\left\{\Gamma(k-1) - \frac{\Gamma(k-1)\cdot\xi(k)\cdot\xi^T(k)\cdot\Gamma(k-1)}{\lambda + \xi^T(k)\cdot\Gamma(k-1)\cdot\xi(k)}\right\} \tag{16}$$

where θ(k) is θ at time k, Γ(k) is Γ at time k, and λ is a forgetting factor and satisfies $0<\lambda<1$.

In this manner, the estimator 37 estimates the stiffness coefficient ku and the viscosity coefficient cu of the user U by using the user model.

The estimator 37 assumes an object model expressed by Equation (17) by using a mechanical impedance of the object W, that is, the stiffness coefficient kw and the viscosity coefficient cw.

[Eq. 14]

$$fs = kw \cdot xs + cw \cdot xs' \tag{17}$$

where xs is a displacement amount of the end effector 11.

From this object model, the estimator 37 sets θ and ξ as expressed by Equation (18), and estimates θ moment by moment during the force control by the forgetting factor recursive least square method expressed by Equations (15) and (16). In Equation (15), y(k) is substituted by fs of Equation (17).

[Eq. 15]

$$\theta = \begin{bmatrix} kw \\ cw \end{bmatrix}, \xi = \begin{bmatrix} xs \\ xs' \end{bmatrix} \tag{18}$$

In this manner, the estimator 37 estimates the stiffness coefficient kw and the viscosity coefficient cw of the object W by using the object model.

The estimator 37 assumes a slave model as a first-order lag system model using the time constant Tr, as expressed by Equation (19):

[Eq. 16]

$$Xcur = \frac{1}{1 + Tr \cdot s} \cdot Xcmd \tag{19}$$

where Xcur is a current position, and Xcmd is an instruction position.

From this slave model, the estimator 37 sets θ and ξ as expressed by Equation (20), and estimates θ moment by moment during the force control by the forgetting factor recursive least square method expressed by Equations (15) and (16). In Equation (15), y(k) is substituted by Xcur of Equation (19).

[Eq. 17]

$$\theta = \begin{bmatrix} -\frac{1}{Tr} \\ \frac{1}{Tr} \end{bmatrix}, \xi = \begin{bmatrix} Xcur \\ Xcmd \end{bmatrix} \tag{20}$$

In this manner, the estimator 37 estimates the time constant Tr of the robot 1 by using the slave model.

The estimator 37 assumes a master model as a first-order lag system model using the time constant Tc, as expressed by Equation (21).

[Eq. 18]

$$Xcur = \frac{1}{1 + Tc \cdot s} \cdot Xcmd \tag{21}$$

From this master model, the estimator 37 sets θ and ξ as expressed by Equation (22), and estimates θ moment by moment during the force control by the forgetting factor recursive least square method expressed by Equations (15) and (16). In Equation (15), y(k) is substituted by Xcur of Equation (21).

[Eq. 19]

$$\theta = \begin{bmatrix} -\frac{1}{Tc} \\ \frac{1}{Tc} \end{bmatrix}, \xi = \begin{bmatrix} Xcur \\ Xcmd \end{bmatrix} \tag{22}$$

In this manner, the estimator 37 estimates the time constant Tc of the operator 2 by using the master model.

It should be noted that the dynamic characteristics of the user U and so forth estimated as described above cannot be estimated in some state of the robot 1 or other components. For example, in a case where the user U does not hold the handle 21, no operation force fm is detected, and thus, the estimator 37 cannot estimate the stiffness coefficient ku and other factors. In a case where the end effector 11 is not in contact with the object W, no contact force fs is detected, and thus, the estimator 37 cannot estimate the stiffness coefficient kw and other factors. Alternatively, in a case where the robot 1 and the operator 2 are stopped, the end effector 11 and the operator 2 are not displaced, and thus, the estimator 37 cannot estimate the time constant Tr and other factors.

Figure 12:
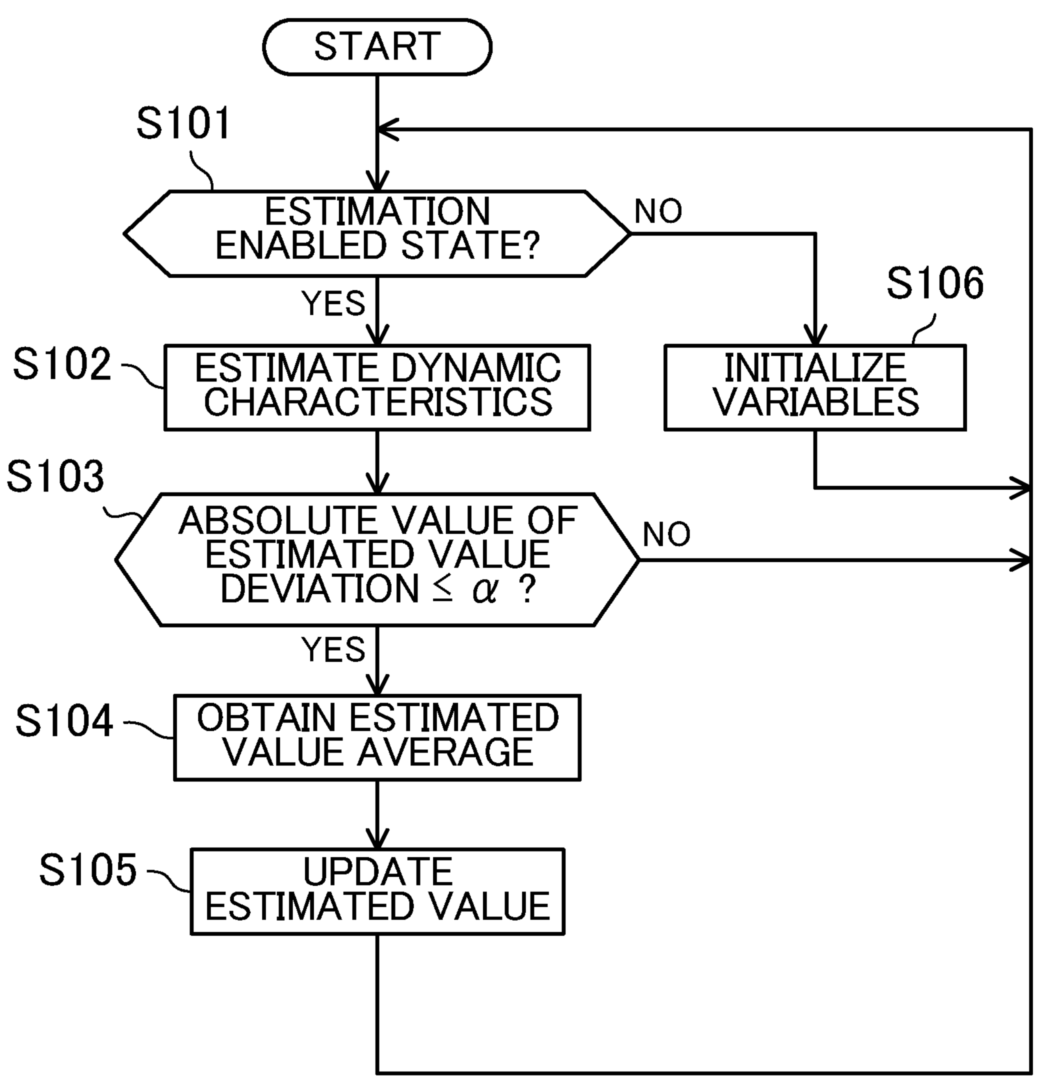
FIG. 12 is a flowchart of an estimation process by an estimator.

For this reason, the estimator 37 has the function of determining whether dynamic characteristics of the user U and so forth can be estimated or not, and if not, holding the estimated value. FIG. 12 is a flowchart of an estimation process by the estimator 37. The process according to this flowchart is executed for estimation of the dynamic characteristic of each of the object W, the user U, the robot 1, and the operator 2. That is, the estimator 37 performs estimation of the object W, estimation of the dynamic characteristic of the user U, estimation of the dynamic characteristic of the robot 1, and estimation of the dynamic characteristic of the operator 2 individually in parallel according to the flowchart of FIG. 12.

At start of estimation, initial values are set for the stiffness coefficient kw, the viscosity coefficient cw, the stiffness coefficient ku, the viscosity coefficient cu, the time constant Tr, and the time constant Tc. Initial values are also set for θ, Γ, and λ in Equations (15) and (16) of forgetting factor recursive least square method in estimation of each of the object W, the user U, the robot 1, and the operator 2.

First, in step S101, the estimator 37 determines whether estimation of the dynamic characteristic can be performed or not.

For example, to estimate the dynamic characteristic of the user U or the object W, the operation force fm or the contact force fs is needed as described above. However, in a case where the user U does not exert a force on the handle 21, no operation force fm is detected. In addition, while the end effector 11 is not in contact with the object W, no contact force fs is detected. Thus, in the case of estimating the dynamic characteristic of the user U or the object W, the estimator 37 determines whether or not the operation force fm or the contact force fs is detected for a predetermined period or longer. The estimator 37 determines that detection of the operation force fm or the contact force fs is not instantaneous but continues for the predetermined period, and based on this determination, determines whether detection of the operation force fm or the contact force fs is due to a treatment or is accidental.

If the operation force fm or the contact force fs is detected for the predetermined period or longer, the estimator 37 determines that the dynamic characteristic of the user U or the object W is in a state where the dynamic characteristic can be estimated (estimation enabled state). On the other hand, if the operation force fm or the contact force fs is not detected for the predetermined period or longer, the estimator 37 determines that the dynamic characteristic of the user U or the object W is in a state where the dynamic characteristic cannot be estimated (estimation disabled state).

On the other hand, to estimate the dynamic characteristic of the robot 1 or the operator 2, displacement of the end effector 11 or the handle 21 is needed as described above.

Thus, in the case of estimating the dynamic characteristic of the robot 1 or the operator 2, the estimator 37 determines whether the end effector 11 or the handle 21 is displaced or not. Specifically, the estimator 37 determines that the end effector 11 or the handle 21 is displaced based on the fact that the instruction speed xd' is a predetermined threshold or more.

In the case where the end effector 11 or the handle 21 is displaced, the estimator 37 determines that the dynamic characteristic of the robot 1 or the operator 2 is in the estimation enabled state. On the other hand, in a case where the end effector 11 or the handle 21 is not displaced, the estimator 37 determines that the dynamic characteristic of the robot 1 or the operator 2 is in the estimation disabled state.

If it is determined that the dynamic characteristic is in the estimation enabled state in step S101, the estimator 37 estimates the dynamic characteristic by a forgetting factor recursive least square method in step S102. In the case of estimating the dynamic characteristic of the user U or the object W, the displacement amount of the handle 21 or the end effector 11 is needed, as expressed by Equations (14) and (18) and other equations. Thus, the position of the handle 21 or the end effector 11 is set at an initial position when the dynamic characteristic is determined to be in the estimation enabled state in step S101, and the displacement of the handle 21 or the end effector 11 is obtained. The estimated value obtained in step S102 is temporary, and is not a definite estimated value. An estimated value from being estimated in step S102 before being confirmed will be hereinafter referred to as a "newly estimated value," and an estimated value that is confirmed and held will be hereinafter referred to as a "current estimated value."

Next, in step S103, the estimator 37 determines whether or not an absolute value of a deviation between the newly estimated value and the current estimated value is a predetermined value a or less. For example, if the estimation disabled state shifts to the estimation enabled state, a variation of the estimated value is temporarily large in some cases. In step S103, it is determined whether there is such a large variation or not.

If the absolute value of the deviation is larger than the predetermined value a, the estimator 37 does not update the current estimated value, returns to step S101, and performs the process of step S101 again.

On the other hand, if the absolute value of the deviation is the predetermined value a or less, the estimator 37 obtains an average of estimated values in step S104. Specifically, the estimator 37 obtains an average of an immediately preceding predetermined number of estimated values including the newly estimated value and the current estimated value. Subsequently, in step S105, the estimator 37 updates the current estimated value to the average of the estimated values. An abrupt change of the current estimated value is prevented by updating the current estimated value with the average value of the estimated values.

Thereafter, the estimator 37 returns to step S101, and repeats the processes from step S101.

On the other hand, if it is determined that the dynamic characteristic is in the estimation disabled state in step S101, the estimator 37 initializes variables (specifically $\theta$, $\Gamma$, and $\lambda$) of an estimation formula in the forgetting factor recursive least square method in step S106. Then, the estimator 37 returns to step S101, and performs the process in step S101. During the estimation disabled state, the estimator 37 repeats the processes in steps S101 and S106. Then, when the estimation disabled state shifts to the estimation enabled state, the estimator 37 performs processes subsequent to step S102, and performs processes such as derivation of the newly estimated value and update of the current estimated value. That is, during the estimation disabled state, the estimator 37 holds the current estimated value without updating.

In this manner, the estimator 37 estimates the dynamic characteristics of the user U and so forth during the force control. The estimator 37 determines whether the dynamic characteristic can be estimated or not to thereby estimate the dynamic characteristic appropriately. As a result, the presenter 38 can obtain a frequency characteristic of the force control appropriately and presents the obtained frequency characteristic.

<Automatic Adjustment of Control Parameter>

In the robot system 100, a control parameter of the force control is automatically adjusted such that the frequency characteristic of the force control approaches the target frequency characteristic. Specifically, the setter 39 sets the target frequency characteristic, and the adjuster 310 adjusts the control parameter in accordance with the target frequency characteristic. At this time, the dynamic characteristics of the user U and so forth estimated by the estimator 37 are used.

Specifically, the setter 39 receives an input of the target frequency characteristic of the force control from the user U through the inputter 34 and sets the target frequency characteristic. The setter 39 sets a target frequency characteristic of the slave control system 7B and a target frequency characteristic of the master control system 7A individually. That is, the user U inputs the target frequency characteristic of one or both of the slave control system 7B and the master control system 7A through the inputter 34.

At this time, before the input of the target frequency characteristic, the presenter 38 may present the frequency characteristic. In this case, the user can input the target frequency characteristic with reference to the presented current frequency characteristic. Alternatively, in a case where the target frequency characteristic is determined beforehand, for example, the target frequency characteristic may be input without presentation of the frequency characteristic by the presenter 38.

The input target frequency characteristic can be any parameter related to the frequency characteristic. For example, the parameter as the target frequency may be a first evaluation value (i.e., speed) and a second evaluation value (i.e., vibration resistance) that are the same as those in the frequency characteristic presented by the presenter 38. In a case where the target frequency characteristic is input after presentation of the current frequency characteristic by the presenter 38, the presented frequency characteristic and the input target frequency characteristic are preferably the same parameter. It should be noted that the parameter as the target frequency characteristic may be a parameter different from the frequency characteristic presented by the presenter 38. For example, the parameter as the target frequency characteristic may be a gain crossover frequency and a gain margin.

The adjuster 310 adjusts control parameters separately for the master control system 7A and the slave control system 7B. Specifically, the adjuster 310 generates a first control parameter that is a control parameter adjusted such that the frequency characteristic of the master control system 7A approaches the target frequency characteristic, and a second control parameter that is a control parameter adjusted such that the frequency characteristic of the slave control system 7B approaches the target frequency characteristic. That is, the first control parameter is adjusted in accordance with the dynamic characteristics of the user U and so forth. The second control parameter is adjusted in accordance with the dynamic characteristics of the object W and so forth.

In a case where the target frequency characteristic of only one of the master control system 7A and the slave control system 7B are set, the adjuster 310 generates one of the first control parameter and the second control parameter corresponding to the control system for which the target frequency characteristic is set.

Specifically, in a case where the target frequency characteristic of the master control system 7A is set, the adjuster 310 adjusts the control parameter based on the block schematic of the master control system 7A illustrated in FIG. 10 and the open-loop transfer function Gm(jω) of the master control system 7A of Equation (7). The adjuster 310 adjusts the control parameter by using the dynamic characteristic of the user U and the dynamic characteristic of the operator 2. For example, the adjuster 310 adjusts the inertial coefficient md and the viscosity coefficient cd by using the mechanical impedance of the user U, that is, the stiffness coefficient ku and the viscosity coefficient cu, and frequency response of the operator 2, that is, the time constant Tc, estimated by the estimator 37 such that the gain crossover frequency ωcg1 and the gain margin gm1 of the master control system 7A approach values corresponding to the target frequency characteristic. The adjusted inertial coefficient md and viscosity coefficient cd are the first control parameters.

In a case where the target frequency characteristic of the slave control system 7B is set, the adjuster 310 adjusts the control parameter based on the block schematic of the slave control system 7B illustrated in FIG. 11 and the open-loop transfer function Gs(jω) of the slave control system 7B of Equation (12). The adjuster 310 adjusts the control parameter by using the dynamic characteristic of the object W and the dynamic characteristic of the robot 1. For example, the adjuster 310 adjusts the inertial coefficient md and the viscosity coefficient cd by using the mechanical impedance of the object W, that is, the stiffness coefficient kw and the viscosity coefficient cw, and frequency response of the robot 1, that is, the time constant Tr, estimated by the estimator 37 such that the gain crossover frequency ωcg2 and the gain margin gm2 of the slave control system 7B reach values corresponding to the target frequency characteristic. The adjusted inertial coefficient md and viscosity coefficient cd are the second control parameters.

The stiffness coefficient ku, the viscosity coefficient cu, the stiffness coefficient kw, the viscosity coefficient cw, the time constant Tc, and the time constant Tr can change during the force control as described above. Thus, the adjuster 310 continuously adjusts the inertial coefficient md and the viscosity coefficient cd by using the stiffness coefficient ku, the viscosity coefficient cu, the stiffness coefficient kw, the viscosity coefficient cw, the time constant Tc, and the time constant Tr continuously estimated by the estimator 37 during the force control.

Various methods can be employed to derive the inertial coefficient md and the viscosity coefficient cd with which the frequency response approaches the target frequency response. For example, the adjuster 310 adjusts the inertial coefficient md and the viscosity coefficient cd by using fictitious reference iterative tuning (FRIT). The FRIT is a data-driven adjustment technique.

Alternatively, the adjuster 310 may obtain a gain crossover frequency and a gain margin corresponding to the target frequency characteristic and obtain the inertial coefficient md and the viscosity coefficient cd based on the open-loop transfer function Gm or the open-loop transfer function Gs by using the obtained gain crossover frequency and gain margin and the time constant Tc, the stiffness coefficient ku, and the viscosity coefficient cu estimated by the estimator 37, or the time constant Tr, the stiffness coefficient kw, and the viscosity coefficient cw estimated by the estimator 37.

The adjuster 310 performs adjustment of such control parameters during the force control. The force controller 36 performs the force control by using the control parameters adjusted by the adjuster 310. Specifically, the force-speed converter 64 obtains an instruction speed xd' by using the adjusted control parameters. At this time, the force controller 36 performs the force control by using the first control parameter or the second control parameter.

Figure 13:
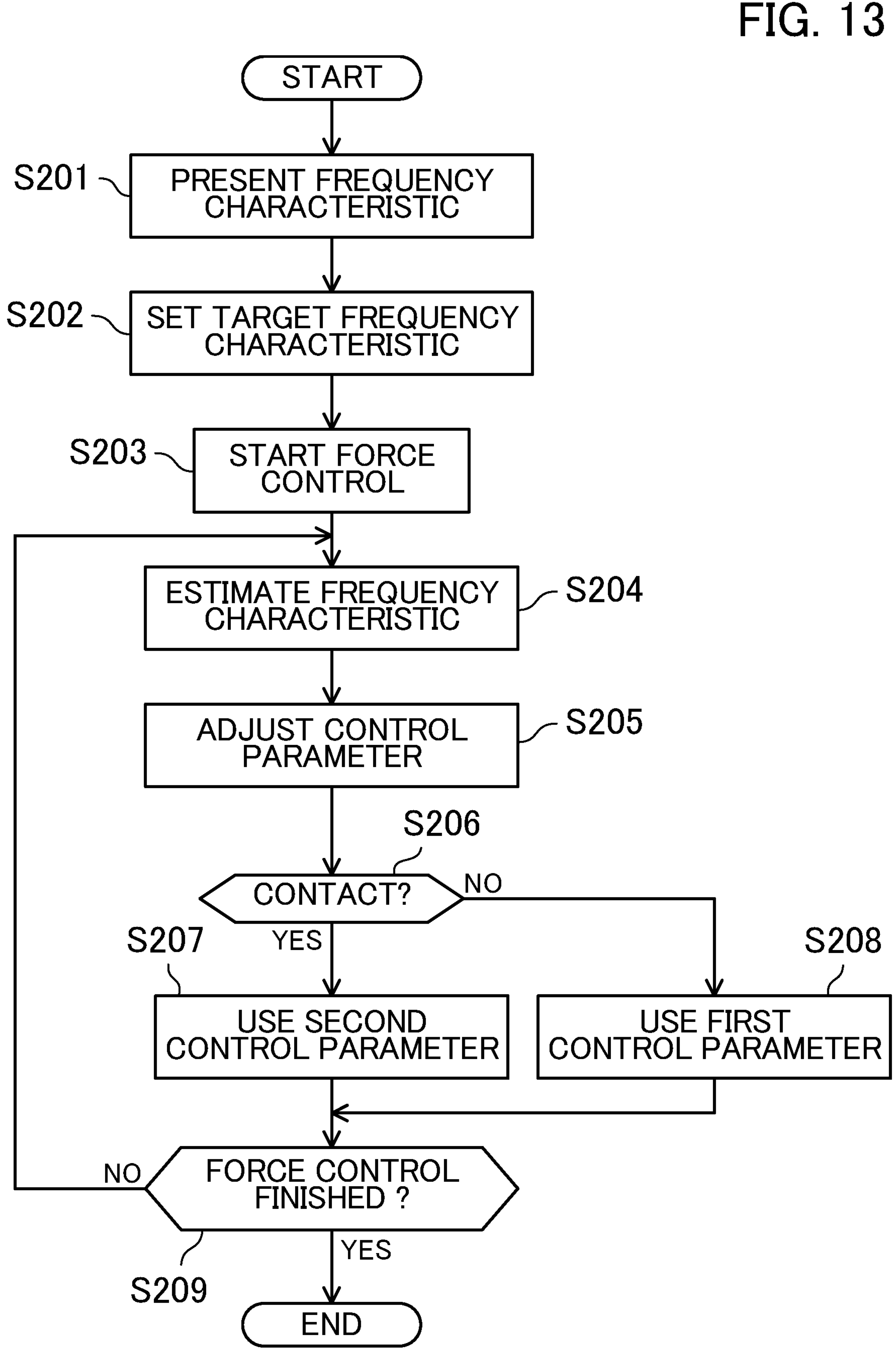
FIG. 13 is a flowchart of control parameter adjustment.

A process in which the force controller 36 uses the first control parameter and the second control parameter selectively to perform the force control will now be described as an example. FIG. 13 is a flowchart of control parameter adjustment.

First, in step S201, the presenter 38 presents a current frequency characteristic of force control. Specifically, in a case where a frequency characteristic is obtained in force control already performed by the current user U, the object W, the robot 1, and the operator 2, for example, the presenter 38 presents the obtained frequency characteristic to the user U through the display 35.

In response to the presentation, when the user U inputs the target frequency characteristic through the inputter 34, the setter 39 receives the input of the target frequency characteristic of the force control and sets the target frequency characteristic. In this example, the target frequency characteristics for both the master control system 7A and the slave control system 7*b* are set.

Thereafter, in step S203, the force controller 36 starts force control. After the start of the force control, in step S204, the estimator 37 estimates dynamic characteristics of the user U and so forth. Step S204 corresponds to estimating a dynamic characteristic of the user.

Then, in step S205, the adjuster 310 adjusts the control parameter in accordance with the dynamic characteristics of the user U and so forth such that the frequency characteristic of the force control approaches the target frequency characteristic. At this time, the adjuster 310 generates a first control parameter adjusted such that the frequency characteristic of the master control system 7A approaches the target frequency characteristic and a second control parameter adjusted such that the frequency characteristic of the slave control system 7B approaches the target frequency characteristic.

In step S206, the force controller 36 determines whether the end effector 11 is in contact with the object W or not. The force controller 36 determines whether the contact force fs is detected for a predetermined period or longer. If the contact force fs is detected for the predetermined period or longer, the force controller 36 determines that the end effector 11 is in contact with the object W. The force controller 36 determines that detection of the contact force fs is not instantaneous but continues for the predetermined period or longer to thereby determine whether detection of the contact force fs is made by a treatment or accidental.

The predetermined period here may be equal to or different from the predetermined period in which the contact force fs is detected in determining whether the dynamic characteristic is in the estimation enabled state or not (see step S101).

If the end effector 11 is in contact with the object W, the force controller 36 performs force control by using the second control parameter in step S207. That is, the control parameter is adjusted such that the frequency characteristic of the slave control system 7B approaches the target frequency characteristic, and the force control is performed based on the adjusted control parameter.

In this manner, the force controller 36 can perform the force control while preventing vibrations of both the end effector 11 and the handle 21 by using the second control parameter during the treatment by the end effector 11.

Specifically, in step S202, it is, of course, assumed that a target frequency characteristic that hardly causes vibrations is set in each of the master control system 7A and the slave control system 7B. The mechanical impedance of the object W is generally larger than the mechanical impedance of the user U. Thus, the control parameter is adjusted such that the frequency characteristic of the slave control system 7B including the end effector 11 approaches the target frequency characteristic, that is, stability in the slave control system 7B is secured, thereby inevitably preventing vibrations of the handle 21 in the master control system 7A.

On the other hand, in a case where the end effector 11 is not in contact with the object W, the force controller 36 performs force control by using the first control parameter in step S208. That is, the control parameter is adjusted such that the frequency characteristic of the master control system 7A approaches the target frequency characteristic, and force control is performed based on the adjusted control parameter.

In the case where the end effector 11 is not in contact with the object W, unless the handle 21 vibrates, the end effector 11 does not vibrate. Thus, the control parameter is adjusted such that the frequency characteristic of the master control system 7A including the handle 21 approaches the target frequency characteristic, thereby inevitably preventing vibrations of the end effector 11 in the slave control system 7B.

Steps S205, S206, S207, and S208 correspond to adjusting a control parameter of the force control in accordance with the estimated dynamic characteristic of the user such that the frequency characteristic of the force control approaches the target frequency characteristic.

After step S207 or S208, the force controller 36 determines whether force control is finished or not in step S209. If the force control is not finished, the force controller 36 repeats the processes from step S206.

In this manner, the force controller 36 uses the first control parameter and the second control parameter selectively depending on whether the end effector 11 is in contact with the object W or not. Specifically, if the end effector 11 is in contact with the object W, the second control parameter is used, whereas if the end effector 11 is not in contact with the as object W, the first control parameter is used. As a result, in either case where the end effector 11 is in contact with the object W or not, vibrations of the end effector 11 and the handle 21 are effectively prevented. As a result, behaviors of the robot 1 and the operator 2 in the force control are stabilized.

In the thus-configured robot system 100, the control parameter of the force control is adjusted such that the frequency characteristic with consideration of change of the dynamic characteristic (e.g., mechanical impedance) of the user U or the object W approaches the target frequency characteristic. In addition, the control parameter is also adjusted in consideration of a change of the dynamic characteristic (e.g., frequency response) of the operator 2 or the robot 1. As a result, behaviors of the robot 1 and the operator 2 in the force control are stabilized.

Specifically, since the handle 21 is held by the user U, it can be assumed that the handle 21 is supported not only by the support 22 but also by the user U. That is, stability and responsiveness of the handle 21 are affected by mechanical impedance of the user U. The mechanical impedance of the user U varies among users U. In addition, even for the same user U, the mechanical impedance of the user U can change depending on the posture of the user U, for example, the state of the arms of the user U on whether the arms are extended or bent. Further, similarly to the arms of the user U, stability and responsiveness of the operator 2 can change depending on the state of the support 22. The operator 2 also has some machine differences, though not as much as individual differences among users U, and these machine differences can also affect stability and responsiveness of the operator 2.

On the other hand, since the end effector 11 is in contact with the object W, it can be assumed that the end effector 11 is supported not only by the robot arm 12 but also by the object W. That is, stability and responsiveness of the end effector 11 are affected by the mechanical impedance of the object W. The mechanical impedance of the object W has individual differences among objects W. Further, even for the same object W, the mechanical impedance of the object W can change depending on a portion of the object W to be processed or progress of the process. Moreover, stability and responsiveness of the robot 1 can change depending on the shape of the robot arm 12. The robot 1 also has some machine differences, though not as much as individual differences among objects W, and these machine differences can also affect stability and responsiveness of the robot 1.

If these dynamic characteristics of the object W, the user U, the robot 1, and the operator 2 are not taken into consideration, even when the control parameter is adjusted such that the frequency characteristic approaches the target frequency characteristic, the frequency characteristic is not easily stabilized.

For example, when the user U changes to another user U, or even the same user U changes the posture, the frequency characteristic of the force control can change. In some cases, the handle 21 held by the user U might vibrate. Alternatively, when the object W changes to another object W or a portion of the object W to be processed changes to another portion, the frequency characteristic of the force control can change. In some cases, the end effector 11 might vibrate.

When the posture of the support 22 of the operator 2 or the robot arm 12 of the robot 1 changes, the frequency characteristic of the force control can change. For example, responsiveness of the force control can change.

In the robot system 100, actual mechanical impedance of the user U, frequency response of the operator 2, mechanical impedance of the object W, and frequency response of the robot 1 are estimated, and the control parameter of the force control is adjusted such that the frequency characteristic of the force control with consideration of changes of these dynamic characteristics approach the target frequency characteristics. Accordingly, the control parameter is adjusted to be adapted to changes of the dynamic characteristics of the user U and so forth. As a result, even with changes of the user U and so forth, a behavior in the force control is stabilized.

In the manner described above, the controller 3 includes: the force controller 36 that performs force control of moving the robot 1 (slave) in accordance with an operation force exerted on the operator 2 (master) from the user U to apply a treatment to the object W and of moving the operator 2 in accordance with a reaction force exerted on the robot 1 from the object W; the estimator 37 that estimates the dynamic characteristic of the user U; and the adjuster 310 that adjusts the control parameter of the force control in accordance with the estimated dynamic characteristic of the user U such that the frequency characteristic of the force control approaches the target frequency characteristic.

In other words, the robot control method by the controller 3 includes: performing force control of moving the robot 1 in accordance with the operating force exerted on the operator 2 from the user U to apply a treatment to the object W and of moving the operator 2 in accordance with the reaction force exerted on the robot 1 from the object W; estimating the dynamic characteristic of the user U; and adjusting the control parameter of the force control in accordance with the estimated dynamic characteristic of the user U such that the frequency characteristic of the force control approaches the target frequency characteristic.

The robot control program 321 is a robot control program that causes a computer to execute the function of controlling the robot system 100 including the operator 2 on which the operation force is exerted from the user U and the robot 1 that applies a treatment to the object W, and the program includes the functions of: performing force control of moving the robot 1 in accordance with an operation force exerted on the operator 2 to apply a treatment to the object W and of moving the operator 2 in accordance with the reaction force exerted on robot 1 from the object W; estimating the dynamic characteristic of the user U; and adjusting the control parameter of the force control in accordance with the estimated frequency characteristic of the user such that the frequency characteristic approaches the target frequency characteristic.

The robot system 100 includes: the operator 2 that is operated by the user U; the robot 1 that applies a treatment to the object W; and the controller 3.

With these configurations, the frequency characteristic of the force control approaches the target frequency characteristic by adjusting the control parameter. In this adjustment, a change of the dynamic characteristic of the user U is taken into consideration. That is, since the operating force is exerted on the operator 2 from the user U, stability and responsiveness of the operator 2 in the force control are affected by the dynamic characteristic of the user U. The dynamic characteristic of the user U can change depending on individual differences among users U, the posture of the user U, and so forth. The dynamic characteristic of the user U to be used for adjustment of the control parameter is not constant, and is estimated by the estimator 37. The estimated dynamic characteristic of the user U changes in accordance with differences such as individual differences among users U or a change of the user U. Thus, the control parameter of the force control is adjusted such that the frequency characteristic with consideration of individual differences among users U, the posture of the user U, and so forth approaches the target frequency characteristic. As a result, even with a change of the user U and other changes, a behavior of the force control can be stabilized.

The estimator 37 estimates the dynamic characteristic of the operator 2, and the adjuster 310 adjusts the control parameter in accordance with the estimated dynamic characteristic of the user U and the estimated dynamic characteristic of the operator 2 such that the frequency characteristic approaches the target frequency characteristic.

With this configuration, in adjusting the control parameter, the dynamic characteristic of the operator 2 as well as the dynamic characteristic of the user U is taken into consideration. That is, stability and responsiveness of the operator 2 in the force control are affected by the dynamic characteristic of the operator 2. The dynamic characteristic of the operator 2 can change depending on machine differences among operators 2, situations, and so forth. The dynamic characteristic of the operator 2 to be used for adjustment of the control parameter is not constant, and is estimated by the estimator 37. The estimated dynamic characteristic of the operator 2 changes in accordance with differences among operators 2, a change of the operator 2, or the like. Thus, the control parameter of the force control is adjusted such that the frequency characteristic with consideration of machine differences among operator 2, situations, and so forth approaches the target frequency characteristic. As a result, even with changes of the user U and the operator 2 and other changes, a behavior of the force control can be stabilized.

In addition, the estimator 37 estimates the dynamic characteristic of the object W, and the adjuster 310 adjusts the control parameter in accordance with the estimated dynamic characteristic of the user U and the estimated dynamic characteristic of the object W such that the frequency characteristic approaches the target frequency characteristic.

With this configuration, in adjustment of the control parameter, a change of the dynamic characteristic of the object W is taken into consideration. That is, since the end effector 11 is in contact with the object W, stability and responsiveness of the robot 1 in the force control are affected by the dynamic characteristic of the object W. The dynamic characteristic of the object W can change depending on individual differences among objects W and so forth. The dynamic characteristic of the object W to be used for adjustment of the control parameter is not constant, and is estimated by the estimator 37. The estimated dynamic characteristic of the object W changes in accordance with differences such as individual differences among objects W or a change of the object W. Thus, the control parameter of the force control is adjusted such that the frequency characteristic with consideration of individual differences among objects W, the posture of the object W, and so forth approaches the target frequency characteristic. As a result, even with a change of the object W and other changes, a behavior of the force control can be stabilized.

The adjuster 310 generates the first control parameter and the second control parameter, the first control parameter is a control parameter adjusted in accordance with the dynamic characteristic of the user U, the second control parameter is a control parameter adjusted in accordance with the dynamic characteristic of the object W, and the force controller 36 performs the force control by using the first control parameter and the second control parameter selectively.

With this configuration, the first control parameter for allowing the frequency characteristic of the master control system 7A to approach the target frequency characteristic and the second control parameter for allowing the frequency characteristic of the slave control system 7B to approach the target frequency characteristic are generated. The force controller 36 uses the first control parameter and the second control parameter selectively in performing the force control to thereby select a control system for allowing the frequency characteristic to approach the target frequency characteristic between the master control system 7A and the slave control system 7B.

The force controller 36 performs the force control by using the second control parameter while the robot 1 is in contact with the object W, and performs the force control by using the first control parameter while the robot 1 is not in contact with the object W.

With this configuration, while the robot 1 is in contact with the object W, the frequency characteristic of the slave control system 7B is adjusted to the target frequency characteristic. The mechanical impedance of the object W is larger than the mechanical impedance of the user U. Thus, the frequency characteristic of the force control is adjusted in consideration of a change of the dynamic characteristic of the object W so that the frequency characteristic of the master control system 7A including the user U can also be thereby stabilized. On the other hand, while the robot 1 is not in contact with the impedance) of object W, the frequency characteristic of the master control system 7A is adjusted to the target frequency characteristic. While the robot 1 is not in contact, the end effector 11 does not vibrate, and the operator 2 can vibrate. The use of the first control parameter can stabilize movement of the operator 2.

The estimator 37 estimates the dynamic characteristic of the robot 1, and the adjuster 310 generates the second control parameter in accordance with the estimated dynamic characteristic of the object W and the estimated dynamic characteristic of the robot 1 such that the frequency characteristic approaches the target frequency characteristic.

With this configuration, in the second control parameter, a change of not only the dynamic characteristic of the object W but also the dynamic characteristic of the robot 1 is taken into consideration. In the robot 1, frequency response can change in accordance with an operation situation of the robot 1, such as the posture. Thus, with consideration of a change of the dynamic characteristic of the robot 1, stability and responsiveness in the force control can be adjusted.

The controller 3 further includes the setter 39 that receives an input of the target frequency characteristic and sets the target frequency characteristic.

With this configuration, the target frequency characteristic is not constant and can be changed. The target frequency characteristic is appropriately set by the setter 39 so that the frequency characteristic of the force control can be thereby flexibly adjusted.

The controller 3 further includes the presenter 38 that obtains the frequency characteristic of the force control and presents the obtained frequency characteristic.

With this configuration, the user U is allowed to know the current frequency characteristic of the force control. For example, in the configuration including the setter 39, the user U can input the target frequency characteristic after confirming the frequency characteristic presented by the presenter 38.

Other Embodiments

In the foregoing section, the embodiment has been described as an example of the technique disclosed in the present application. The technique disclosed here, however, is not limited to this embodiment, and is applicable to other embodiments obtained by changes, replacements, additions, and/or omissions as necessary. Components described in the above embodiment may be combined as a new exemplary embodiment. Components provided in the accompanying drawings and the detailed description can include components unnecessary for solving problems as well as components necessary for solving problems in order to exemplify the technique. Therefore, it should not be concluded that such unnecessary components are necessary only because these unnecessary components are included in the accompanying drawings or the detailed description.

For example, the master is not limited to the operator 2, and may employ any configuration as long as the user U can apply an operation force. The slave is not limited to the robot 1, and may employ any configuration as long as the slave applies a treatment to the object while being in contact with the object.

The force control by the force controller 36 is an example. The motion equation for deriving the instruction speed xd' from the resultant force fm+fs is not limited to Equation (1). The motion equation may include an elastic coefficient.

The user model, the object model, the master model, and the slave model are examples. Each model may be any model as long as the model represents a dynamic characteristic of a target. For example, the master model or the slave model may be a second-order lag system model. The dynamic characteristic is not limited to mechanical impedance or frequency response (e.g., time constant).

The frequency characteristic processed by the estimator 37, the presenter 38, the setter 39, and the adjuster 310 are not limited to the frequency characteristics of both the master control system 7A and the slave control system 7B. For example, the frequency characteristic may be only the frequency characteristic of the master control system 7A.

The force controller 36 may use the first control parameter and the second control parameter selectively depending on a factor other than the contact of the end effector 11. For example, the force controller 36 may perform the force control by using one of the first control parameter or the second control parameter determined based on an input from the user U or the like.

In regard to the frequency characteristic of the master control system 7A, a change of the dynamic characteristic of the operator 2 may not be taken into consideration. That is, frequency response (i.e., the time constant Tc) of the operator 2 is assumed to be constant, and only a change of the dynamic characteristic (i.e., the stiffness coefficient ku and the viscosity coefficient cu) of the user U may be taken into consideration.

Similarly, in regard to the frequency characteristic of the slave control system 7B, a change of the dynamic characteristic of the robot 1 does not need to be taken into consideration. That is, only a change of the dynamic characteristic (i.e., the stiffness coefficient kw and the viscosity coefficient cw) of the object W may be taken into consideration with frequency response (i.e., the time constant Tr) of the robot 1 assumed to be constant.

In the controller 3, the function of presenting the frequency characteristic of the force control, that is, the presenter 38, may be omitted. The model of presenting the frequency characteristic is not limited to the first evaluation value and the second evaluation value. As the frequency characteristic, a gain crossover frequency or a gain margin may be presented. Alternatively, as the frequency characteristic, an evaluation value representing responsiveness or stability different from speed and vibration resistance may be presented.

The target frequency characteristic set by the setter 39 is not limited to the characteristic input from the inputter 34. The target frequency characteristic may be input to the controller 3 from an external device. In the controller 3, the function of setting the target frequency characteristic of the force control, that is, the setter 39, may be omitted. In this case, the target frequency characteristic may be set beforehand.

The method by which the adjuster 310 adjusts the control parameter is not limited to the method using FRIT. Any method can be employed as long as a control parameter for achieving the target frequency characteristic can be obtained.

The block diagrams and the block schematics described above are examples. Blocks may be implemented as one block, one block may be divided into blocks, and/or some functions may be transferred to another block.

The flowchart described above is an example, and the step(s) may be omitted or changed. Alternatively, the order of steps may be changed, steps performed in series may be processed in parallel, or steps performed in parallel may be processed in series.

The technique of the present disclosure may be a non-transitory computer-readable recording medium in which the above-described program is recorded. The above-described program may be distributed through a transfer medium such as the Internet.

Functions of elements disclosed herein may be performed by using a circuit or a processing circuit including a general-purpose processor, a dedicated processor, an integrated circuit, an application specific integrated circuit (ASIC) configured or programmed to perform disclosed functions, a conventional circuit, and/or a combination thereof. A processor includes a transistor and other circuits, and thus, is assumed to be a processing circuit or a circuit. In the present disclosure, a circuit, a unit, or a means is hardware that performs listed functions, or hardware programmed to perform listed functions. The hardware may be the hardware disclosed herein, or known hardware programmed or configured to perform listed functions. If the hardware is a processor considered as a type of a circuit, the circuit, the means, or the unit is a combination of hardware and software, and software is used for a configuration of hardware and/or a processor.

The invention claimed is:

1. A controller comprising a processor configured to perform operations comprising:

operation as a force controller that performs, using a control parameter, force control comprising moving a slave in accordance with an operation force exerted on a master from a user to apply a treatment to an object and of moving the master in accordance with a reaction force exerted on the slave from the object;

operation as an estimator comprising estimating a dynamic characteristic of the user, estimating a dynamic characteristic of the master, and estimating a dynamic characteristic of the object; and operation as an adjuster comprising:

generating a first control parameter being the control parameter adjusted in accordance with the dynamic characteristic of the user;

generating a second control parameter being the control parameter adjusted in accordance with the dynamic characteristic of the object;

adjusting the first control parameter of the force control in accordance with the estimated dynamic characteristic of the user and the estimated dynamic characteristic of the master such that the frequency characteristic of the force control with the adjusted first control parameter applied, approaches a target frequency characteristic of the master, and adjusting the second control parameter in accordance with the estimated dynamic characteristic of the user and the estimated dynamic characteristic of the object such that the frequency characteristic of the force control with the adjusted second control parameter applied, approaches a target frequency characteristic of the slave, wherein operation as the force controller comprises performing the force control by selectively using the first control parameter and the second control parameter.

2. The controller according to claim 1, wherein operation as the force controller performing the force control by selectively using the first control parameter and the second control parameter comprises performing the force control by using the second control parameter based on the slave being in contact with the object, and performing the force control by using the first control parameter based on the slave being not in contact with the object.

3. The controller according to claim 1, wherein operation as the estimator comprises estimating a dynamic characteristic of the slave, and operation as the adjuster comprises generating the second control parameter in accordance with the estimated dynamic characteristic of the object and the estimated dynamic characteristic of the slave such that the frequency characteristic approaches the target frequency characteristic.

4. The controller according to claim 1, wherein the processor is configured to perform operations further comprising operation as a setter that receives an input of the target frequency characteristic and sets the target frequency characteristic.

5. The controller according to claim 1, wherein the processor is configured to perform operations further comprising operation as a presenter that obtains a frequency characteristic of the force control and presents the obtained frequency characteristic.

6. A robot system comprising:

the controller according to claim 1;

the master that is operated by the user; and the slave that applies a treatment to the object.

7. A robot control method comprising:

performing, using a control parameter, force control comprising moving a slave in accordance with an operation force exerted on a master from a user to apply a treatment to an object and of moving the master in accordance with a reaction force exerted on the slave from the object;

estimating a dynamic characteristic of the user, estimating a dynamic characteristic of the master, and estimating a dynamic characteristic of the object;

generating a first control parameter being the control parameter adjusted in accordance with the dynamic characteristic of the user;

generating a second control parameter being the control parameter adjusted in accordance with the dynamic characteristic of the object;

adjusting the first control parameter of the force control in accordance with the estimated dynamic characteristic of the user and the estimated dynamic characteristic of the master such that the frequency characteristic of the force control with the adjusted first control parameter applied, approaches a target frequency characteristic of the master, and adjusting the second control parameter in accordance with the estimated dynamic characteristic of the user and the estimated dynamic characteristic of the object such that the frequency characteristic of the force control with the adjusted second control parameter applied, approaches a target frequency characteristic of the slave, wherein performing force control further comprises performing the force control by selectively using the first control parameter and the second control parameter.

8. A non-transitory computer readable medium storing a robot control program for controlling a robot system, the robot system including a master on which an operation force is exerted from a user and a slave that applies a treatment to an object, the robot control program, which when read and executed, causes the computer to perform operations comprising:

performing, using a control parameter, force control comprising moving the slave in accordance with the operation force exerted on the master to apply the treatment to the object and of moving the master in accordance with a reaction force exerted on the slave from the object;

estimating a dynamic characteristic of the user, estimating a dynamic characteristic of the master, and estimating a dynamic characteristic of the object;

generating a first control parameter being the control parameter adjusted in accordance with the dynamic characteristic of the user;

generating a second control parameter being the control parameter adjusted in accordance with the dynamic characteristic of the object;

adjusting the first control parameter of the force control in accordance with the estimated dynamic characteristic of the user and the estimated dynamic characteristic of the master such that the frequency characteristic of the force control with the adjusted first control parameter applied, approaches a target frequency characteristic of the master, and adjusting the second control parameter in accordance with the estimated dynamic characteristic of the user and the estimated dynamic characteristic of the object such that the frequency characteristic of the force control with the adjusted second control parameter applied, approaches a target frequency characteristic of the slave, wherein performing force control further comprises performing the force control by selectively using the first control parameter and the second control parameter.

* * * * *